United States Patent
Highman et al.

(10) Patent No.: US 12,189,809 B2
(45) Date of Patent: Jan. 7, 2025

(54) SYSTEM AND METHOD TO IMPLEMENT A TRUST EVALUATION AND SHARING SYSTEM

(71) Applicant: Endera Systems, LLC, McLean, VA (US)

(72) Inventors: Jeff Highman, McLean, VA (US); Raj Ananthanpillai, McLean, VA (US); Jason Pellegrino, McLean, VA (US)

(73) Assignee: Endera Systems, LLC, McLean, VA (US)

(*) Notice: Subject to any disclaimer, the term of this patent is extended or adjusted under 35 U.S.C. 154(b) by 363 days.

(21) Appl. No.: 17/584,370

(22) Filed: Jan. 25, 2022

(65) Prior Publication Data

US 2022/0237318 A1 Jul. 28, 2022

Related U.S. Application Data

(60) Provisional application No. 63/141,286, filed on Jan. 25, 2021.

(51) Int. Cl.
| | | |
|---|---|---|
| G06F 21/62 | (2013.01) | |
| G06F 21/32 | (2013.01) | |
| G06F 21/57 | (2013.01) | |

(52) U.S. Cl.
CPC .......... *G06F 21/6245* (2013.01); *G06F 21/32* (2013.01); *G06F 21/577* (2013.01); *G06F 2221/2137* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 8,359,225 B1* | 1/2013 | Seth | G06Q 10/10 705/7.29 |
| 2020/0042685 A1* | 2/2020 | Tussy | G06V 40/167 |
| 2020/0104939 A1* | 4/2020 | O'Malley | G16H 50/30 |
| 2020/0134656 A1* | 4/2020 | Padmanabhan | H04L 9/0637 |
| 2021/0150056 A1* | 5/2021 | Vax | G06F 16/285 |

* cited by examiner

*Primary Examiner* — Sanchit K Sarker
(74) *Attorney, Agent, or Firm* — Kevin J. McNeely; McNeely, Hare & War, LLP

(57) ABSTRACT

A method of creating a trust profile using a computer includes receiving personal information from a user at the computer, gathering biographical information about the user, validating the personal information from the gathered biographical information, collecting risk information regarding the user according to the validated personal information from at least one data source, assessing the collected risk information, creating a trust profile for the user from the collected risk information, and enabling the user to share the trust score or trust profile with an evaluator.

7 Claims, 37 Drawing Sheets

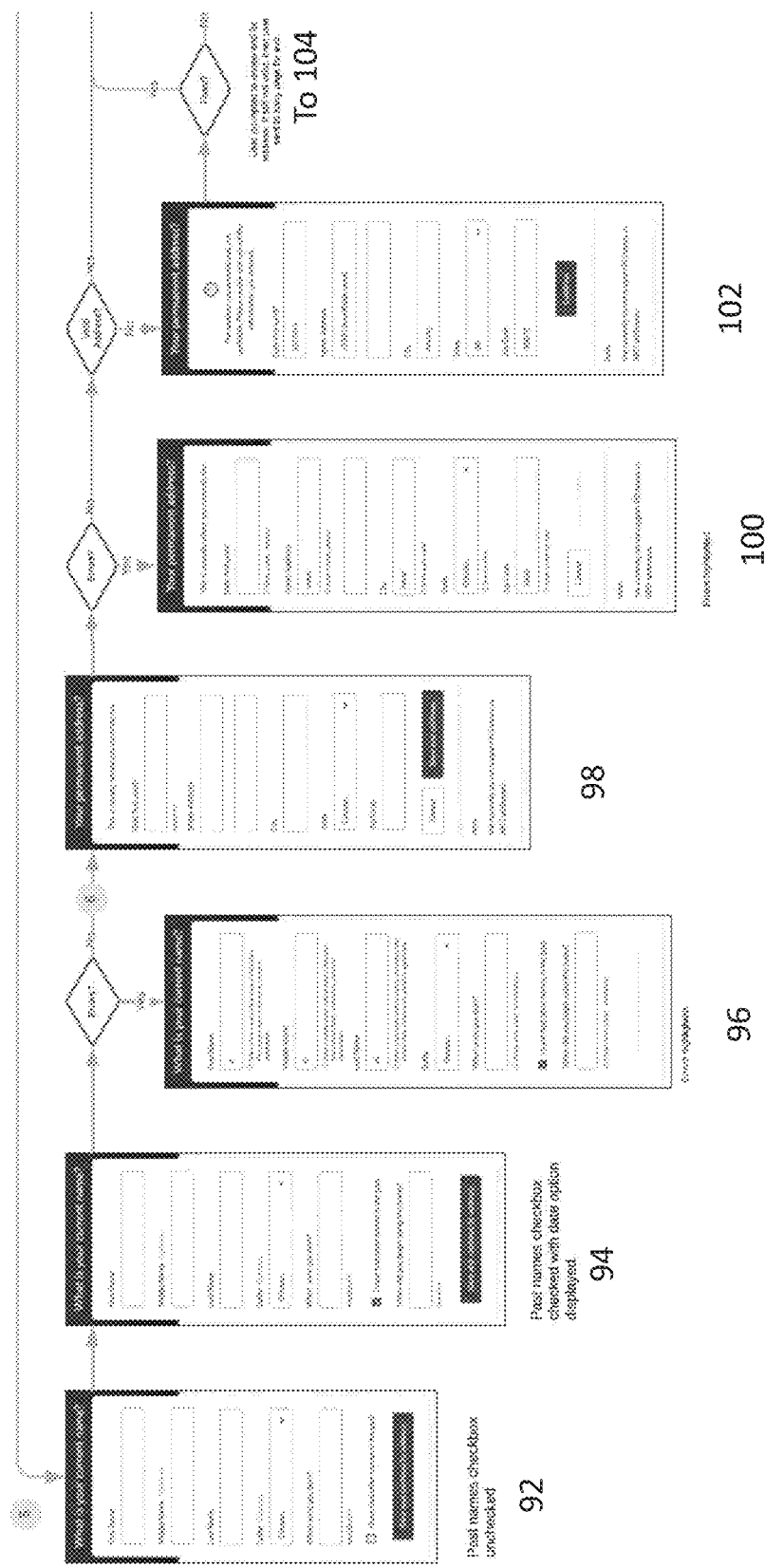

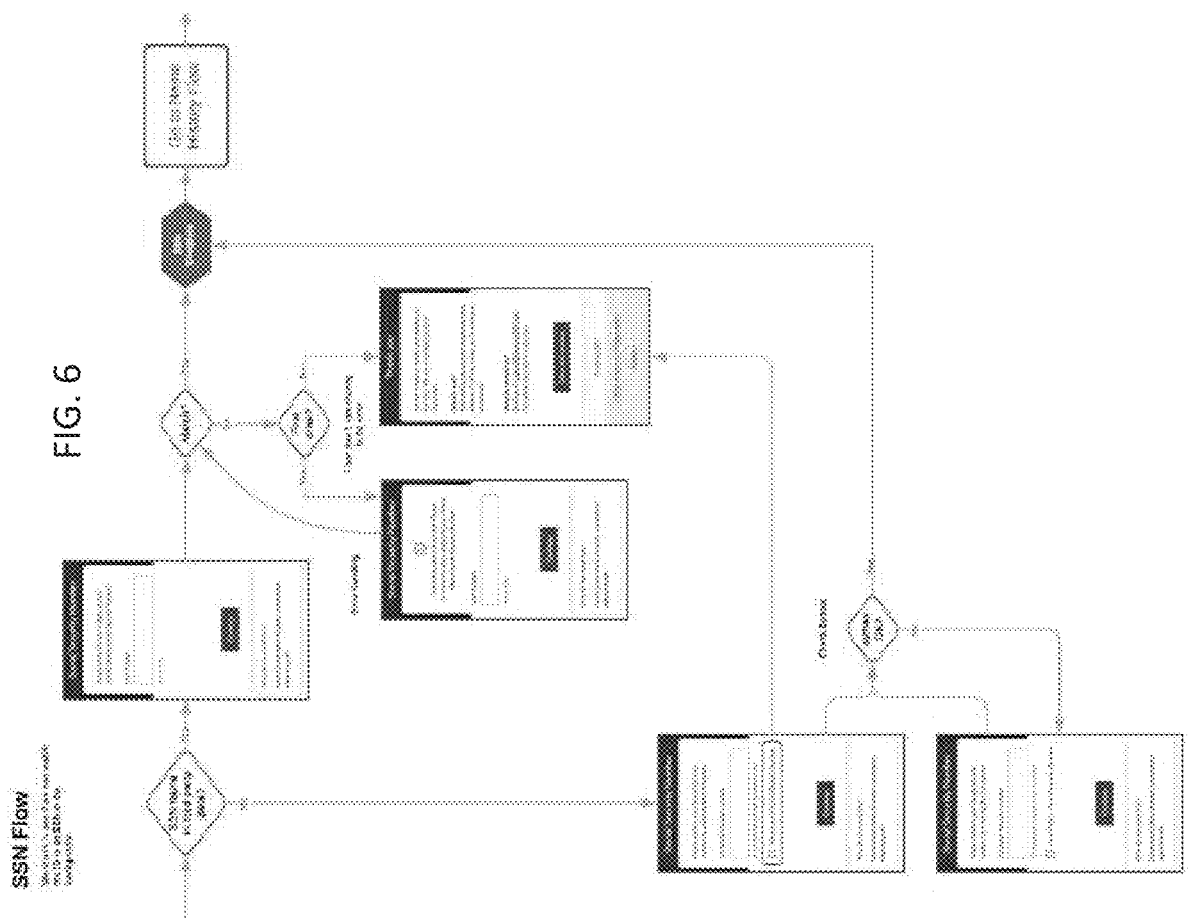

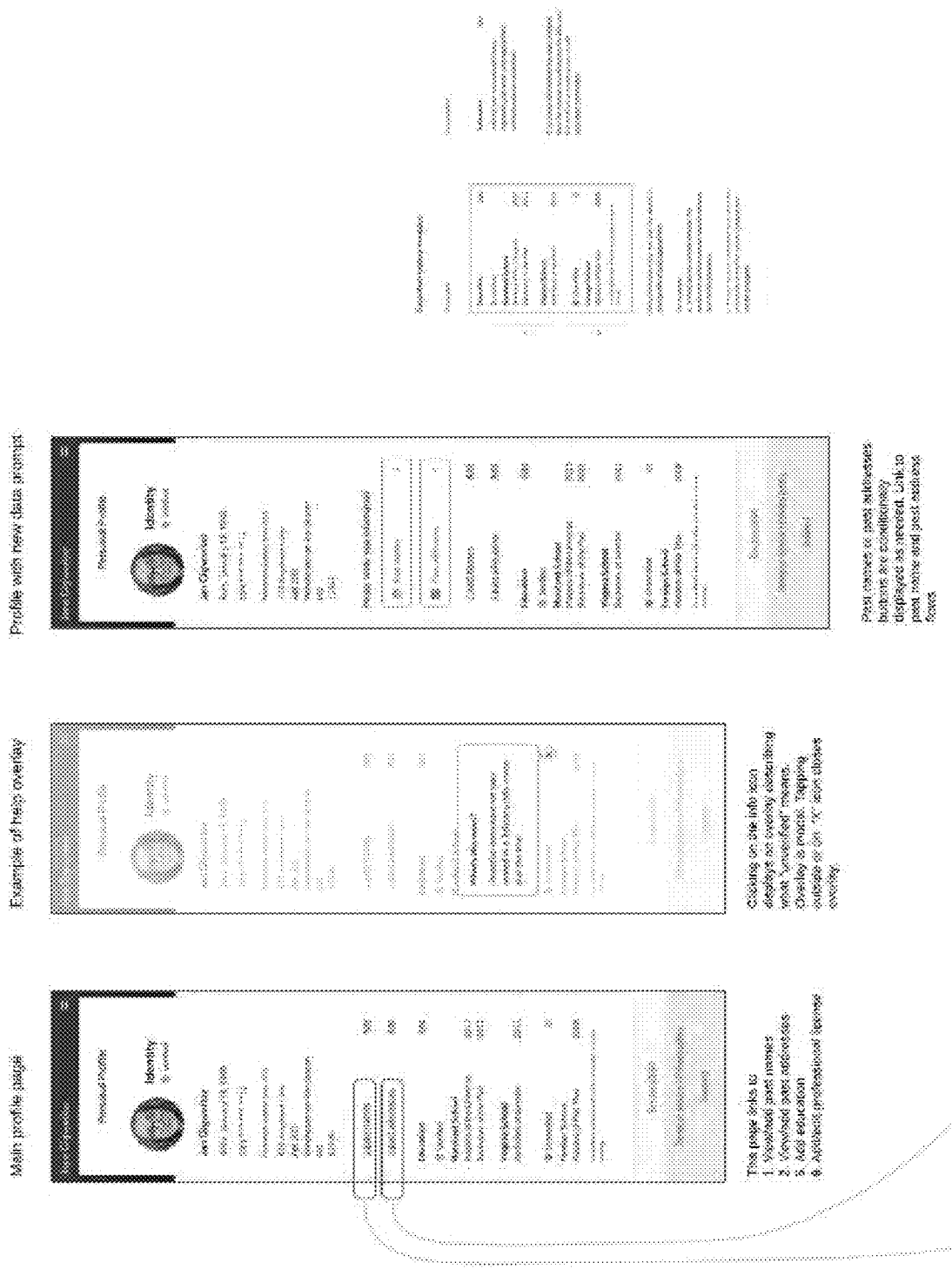

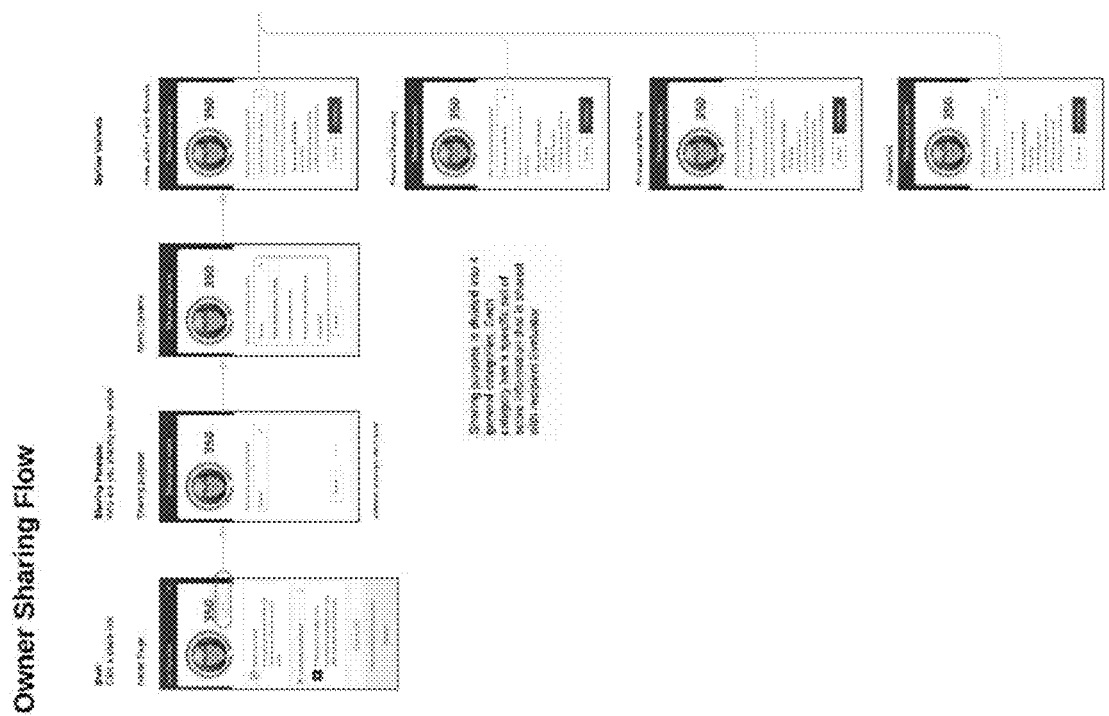

SYSTEM AND METHOD TO IMPLEMENT A TRUST EVALUATION AND SHARING SYSTEM

TECHNICAL FIELD

The present disclosure relates to a system and method for evaluating risk/trust and its method of use.

BACKGROUND

Current security, risk and fraud detection programs that for assessing a person's reliability can generate tremendous amounts of personal information. However, how personal information is accessed, shared and/or utilized remains a significant problem. Attitudes toward privacy indicate that misuse of personal information is a major concern. Moreover, privacy protection can put an evaluator of personal information in danger of violating the law.

SUMMARY

A user can create a "trust" or "risk" profile that provides a trust score based on various factors that are included as part of an overall assessment. For example, user data may be based on public and private records, including civil, criminal and other legal proceedings, biographic information, financial records, academic records and other relevant data.

The system allows a user to develop a "trust" profile that can be shared with others, such as, for example, potential employers. The user has complete control of their (used as singular or plural herein) data in terms of what is shared, the time period that it can be shared and with persons or entities that it can be shared with.

In one general aspect, a method of creating a trust profile using a computer, including receiving personal information from a user at the computer, gathering biographical information about the user, validating the personal information from the gathered biographical information, collecting risk information regarding the user according to the validated personal information from at least one data source, assessing the collected risk information and validated personal information, creating a trust profile for the user from the assessed risk information and validated personal information, and enabling the user to share the trust score or trust profile with an evaluator.

Embodiments include one or more of the following features. For example, collecting may include collecting credential information in addition to risk information regarding the user according to the validated personal information from at least one data source, assessing further includes assessing the collected risk information, validated personal information and credential information, and creating the trust profile further includes creating the trust profile for the user from the assessed risk information, validated personal information and credential information.

Creating the trust profile may include a trust score based on a standardized scoring system wherein the creating the trust profile includes the trust score. Another step may include encrypting the trust profile, wherein the user can share an encrypted trust profile.

As another feature, the trust profile may be customized based on user preferences and the customized trust profile can be shared with the evaluator. For example, the user may limit data that is shared and a time period for sharing the trust profile.

The trust profile may be displayed with at least a portion of a circular ring that varies in length according to the trust score. A portion of the circular ring further may include a color code that varies according to the trust score.

The trust profile may include information regarding identity verification, criminal record status and civil record status and credential status information.

In another general aspect, a computer-readable recording medium containing computer-readable codes providing commands for computers to execute a process includes receiving personal information regarding at least one user at the computer, gathering biographic information about the user from at least one date source, validating the personal information with the biographic information, collecting risk information for the user according to the validated personal information from the at least one data source, creating a trust profile for the user from the personal information, biographic information and risk information, wherein the trust profile includes a trust score based on a standardized scoring system, and enabling the user to share the trust profile.

In a further general aspect, a computer-based system for creating a trust profile for a user includes a storage device to receive, at a computer, personal information regarding at least one user, biographic information from at least one data source and risk information regarding the at least one user from the at least one data source, and a processor to validate the personal information based with the biographic information and to create a trust profile from the personal information, biographic information and the risk information.

In still another general aspect, a method of creating a trust profile with a computer, includes receiving personal information from a user at the computer, gathering biographical information about the user, validating the personal information from the gathered biographical information, identifying geographic locations of the user from the gathered biographical information and the received personal information, preparing a first search set of public records from local data source jurisdictions that encompass the identified geographic locations, calculating an expanded search area for the geographic location of the user, identifying geographical locations of interest within the expanded search area, mapping spatiotemporal data associated with the geographic locations of interest to a second set of local data source jurisdictions, applying additional geographic related reference data to the spatiotemporal data, determining a weighted relevance of the second set of local data source jurisdictions from the applied additional geographic related reference data, quantifying a relative value in searching for public records within each of the weighted second set of local data source jurisdictions relative to a search cost, performing an optimized search of public records in the first set of local data source jurisdictions and a selection of the second set of local data source jurisdictions based on the quantified relative value, assessing collected user information and validated personal information, creating a trust profile for the user from the assessed user information and validated personal information, and enabling the user to share the trust score or trust profile with an evaluator.

The method may include one or more of the above or following features. For example, identifying geographic locations may include identifying vacation homes, rental properties, education, mailing/po boxes, arrest locations and travel history.

Calculating the expanded search area may include adjusting the search area based on local geographic considerations and proximity of hot spot location having higher amounts of criminal activity.

Determining the weighted relevance of the second set of local data source jurisdictions includes considering a centroid distance to a user's known location, an expanse of geographic coverage, a recency and duration of time spent in a location, a population density of a location, a normalized crime rate of a location, and the per capita alcohol consumption or drug usage.

Applying additional geographic related reference data may include consideration of the user's frequency-based mobility, traffic patterns to nearby dense populations, and the geographic distribution of location real estate types as commercial, industrial and residential.

Quantifying the relative value in searching for public records may include assimilating the jurisdiction attributes from each weighted set of relevant jurisdictions into a model to evaluate the value/risk metric of a targeted jurisdiction. Quantifying the relative value in searching for public records may also include selecting an optimal jurisdiction search to balance a maximum search value and a minimal cost.

DESCRIPTION OF THE DRAWINGS

FIGS. 4A-4D is a flowchart of account creation;

FIG. 6 is a flowchart for SSN verification;

FIGS. 10A-10B are user profile views;

FIGS. 15A-15C are owner sharing views and flowcharts;

DETAILED DESCRIPTION

The systems and methods of assessing risk and/or trust using a computer. According to one embodiment, a computer-based system is provided for assessing risks associated with a user 28 and providing the user 28 with a shareable trust or risk score.

A computer-based system includes a computer, such as, for example, a server computer. A server computer should be understood to refer to a service point which provides processing, database, and communication facilities. By way of example, and not limitation, the term server can refer to a single, physical processor with associated communications and/or data storage and/or database facilities, or it can refer to a networked or clustered complex of processors and associated network and/or storage devices, as well as operating software and one or more database systems and/or applications software systems (which can be implemented as modules and/or engines) which support the services provided by the server.

Several non-limiting examples of a computer are a personal computer (e.g., desktop computers or laptop computers), personal digital assistants (PDAs), wireless devices, cellular telephones, internet appliances, media players, home theater systems, media centers, and the like. The computer may also include a plurality of computers connected to teach other through a network. A computing device can include a processor and memory for storing and executing program code, data and software, and may be provided with an operating system that allows the execution of software applications in order to manipulate data. The computer can include one or more input devices, e.g., keyboard, keypad, mouse, etc. and input device interface, for example: a display, such as a screen or monitor, which can be specified using any of a number of languages, including without limitation, a markup language such as Hypertext Markup Language, scripts, applets and the like.

Additionally, the computer may receive and/or transmit personal information, risk and/or trust information, and/or assessment information, from one or more users 28 and/or clients through storage media, wired connections, wireless connections, the internet, Internet, or any other type of communication network using transmission control protocol (TCP) and Internet Protocol (IP). Users 28 may utilize the computer via an input device, such as a keyboard or a mouse. Clients may be computers connected to computer through a network. For example, the computer may receive or transmit these types of information through a flash memory drive, disc media (i.e., CD, DVD, Blu-Ray), a wired network connection (i.e., the internet), or a wireless connection.

Figure 1:
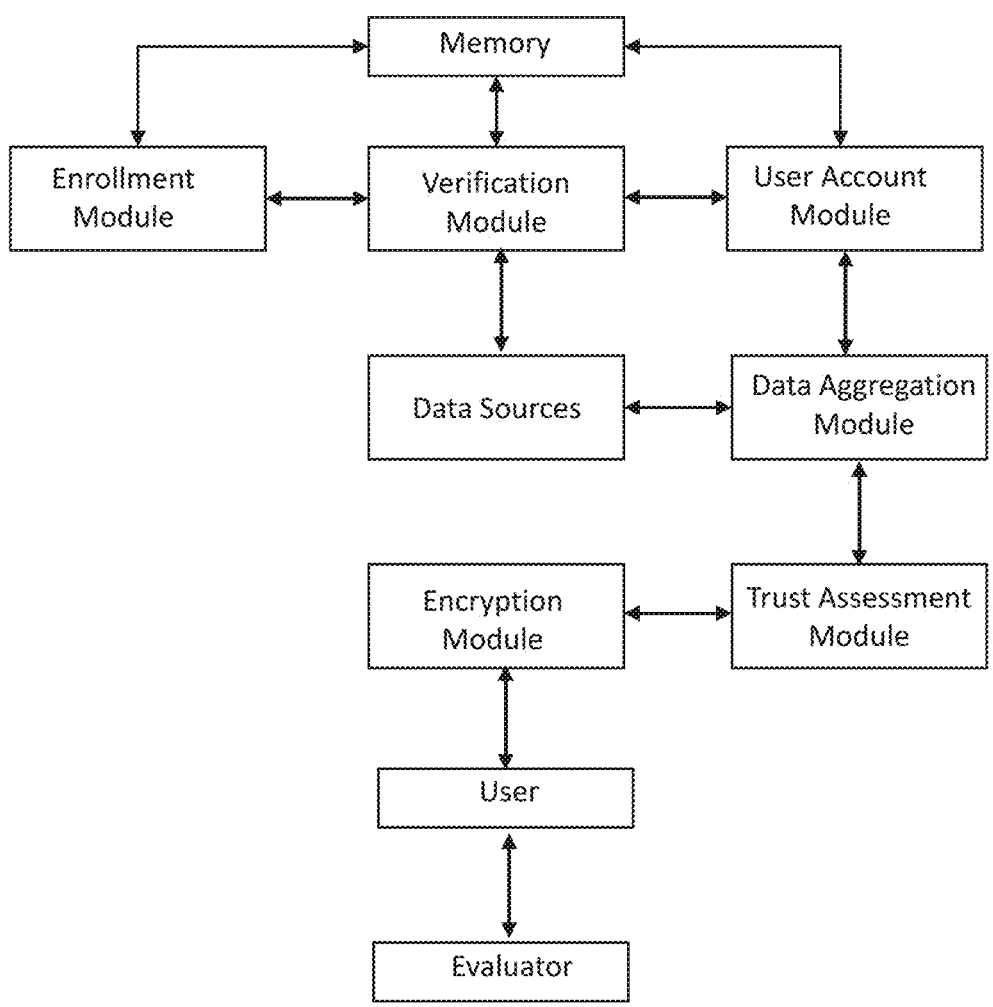
FIG. 1 is a hardware diagram of a trust assessment system.

Referring to FIG. 1, the computer includes an enrollment module 12, a verification module 14, a user account module 16, a data aggregation module 18, a risk/trust assessment module 20 and a memory 22. The modules are not required to be on a single computer. The modules may each be located on the computer or may be located on separate computers connected to the computer over a network, such as the Internet.

The memory 22 may be a fixed disk where an operating system, application programs, and/or data may be stored. For the purposes of this disclosure a module is a software, hardware, or firmware (or combinations thereof) system, process or functionality, or component thereof, that performs or facilitates the processes, features, and/or functions described herein (with or without human interaction or augmentation).

A module can include sub-modules. Software components of a module may be stored on a computer readable medium. Modules may be integral to one or more servers or be loaded and executed by one or more servers. One or more modules may be grouped into an engine or an application and implemented by at least one processor of a computing device.

The enrollment module 12 may receive, at the computer, biographic data that is entered by the user 28. As used herein, the term "user" generally refers to a person. However, a user 28 may be a company, group of people, organization, government entity, and the like, that may pose any kind of risk in need of a trust evaluation.

The user input is then received by the verification module 14. The verification module 14 collects additional personal information which is matched with the user 28 to verify identity. As used herein, the term "personal information"

refers to any information that can uniquely identify a user 28. For example, personal information may include biographic information (e.g., name, address, phone number, social security number, birth date, company's stock symbol, etc.), biometric information (e.g., fingerprints, face recognition, DNA, hand and palm geometry, iris recognition, odor/scent, etc.), driver's license, passport and the like. Personal information may refer to a single unique identifier, such as a fingerprint, or several pieces of information that when taken together can refer only to a single person, i.e., a name, birth date, and address. Additionally, personal information may refer to biographic information and biometric information.

Once the user data is verified, the user account module 16 creates a complete user account with a user profile. The user 28 is provided with a home page with a visual appearance that is described in more detail below.

The data aggregation module 18 may receive, at the computer, user account information and risk/authentication regarding the user 28 according to the personal information from the data sources 24. As used herein, the term "risk information" refers to any quantifiable information that may be considered as indicative of risk for a person or other entity. For example, risk information may include criminal history, civil history, terrorist watch lists, traffic violations, loan or debt delinquencies, outstanding wants or warrants, academic disciplinary history, and/or immigration status. Risk information may also include accusations relating to the previously mentioned types of risks. For example, a security company may want to know whether potential employees have a criminal record. In this example, risk information could include, among other things, any information that relates to the criminal history of a job applicant.

The term "trust information" includes authentication information that tends to demonstrate that the user 28 has the appropriate qualifications that may be required by an evaluator 30. For example, the authentication information may include academic records, certifications, licenses and other credentials. As an example, an accounting firm may want to know if a potential employee has the appropriate academic records and certified public accounting credentials and desires to verify those credentials.

The data source 24 may be a database, electronic documents, the internet, paper files, and the like. The trust assessment module may convert the personal information and risk information to an assessment to provide a trust or risk score. For example, if a job applicant has a criminal background, each criminal charge, disposition, and punishment may be quantified and included in the total score. Risk information may be converted from unstructured data sources 24 using a non-standard data vocabulary and complex data semantics to assessment information using standardized vocabulary and values. The memory may store the personal information, the risk information, and/or the assessment information on the computer.

The personal and risk/trust information may be converted to a trust assessment or trust score using an algorithm by the trust assessment module 20. The algorithm may use logical expressions to automatically convert unstructured text into numeric values which are then used in an overall quantification.

In one embodiment, the user trust profile and trust score is encrypted by an encryption module 26 so that it can only be accessed by the user 28. The user's private data is also protected and/or encrypted.

The user 28 may send their trust score or trust profile to an evaluator 30 or the user 28 may post the score on, for example, on a social media account, website or biographic profile. The data that is evaluated may be, for example, identity verification, criminal record, civil record, and credential verification. The evaluator 30 may be for various types of relationships, such as, for example, employer-employee, sports league-coaching position, potential intimate relationship, etc.

Figure 2A:
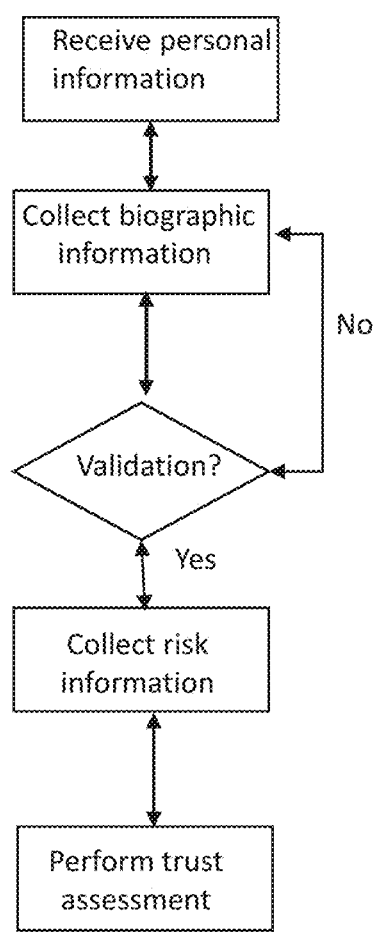
FIG. 2A-2B illustrate flowcharts of a method of producing a trust profile.

The system can be embodied in executable software on a computer. Referring to FIG. 2A, the program is described in terms of high levels steps of the process and further details are provided with respect to the user experience outlined below. The process includes receiving personal information 32 about a user on a computer. Generally, the personal information is derived from the user through the user's input on their own computer device.

The program executes a process to gather additional biographic information 34 about the user from the data sources 24. The data sources 24 may generally be publicly available information about the user.

The program then validates 36 the personal information based on the additional biographic information. If the personal information is not validated, the user is informed that certain additional data may be needed or modified.

Once validated, the process collects risk/authentication information 38 for the user according to the validated personal information from the data sources 24.

The process then creates a trust profile or assessment 40 for the user from the personal information, biographic information and risk/authentication information 38. The trust profile includes a trust score based on a standardized scoring system which can be shared with an evaluator 30.

Figure 2B:
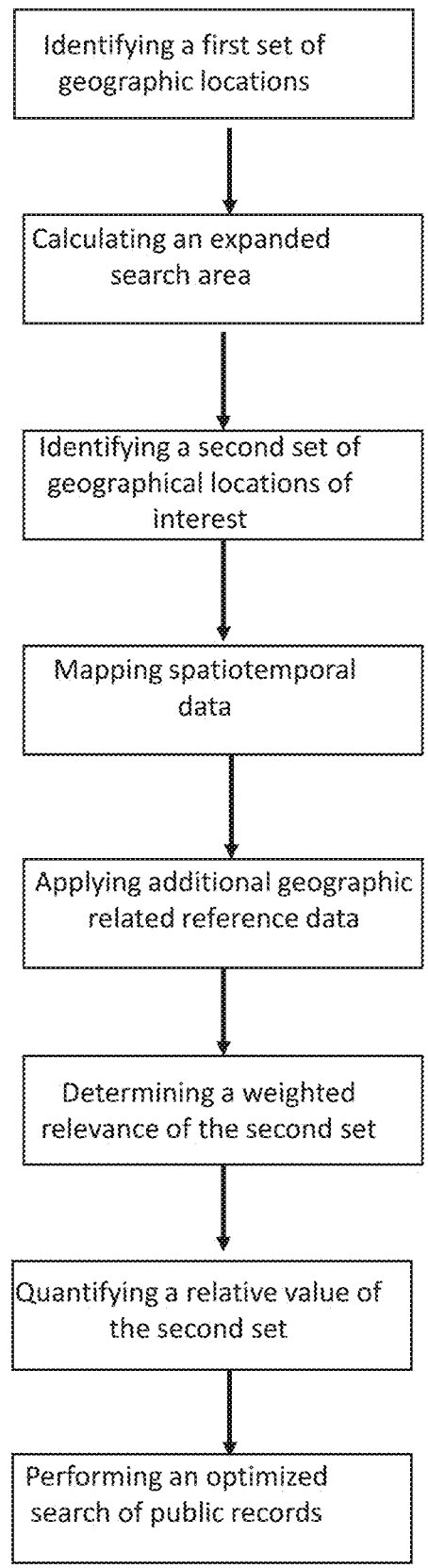

Referring to FIG. 2B, an optimized search of public records can be performed utility an intelligent or adaptive algorithm A first set of geographic locations of the user are identified from the gathered biographical information and the received personal information. Next, an expanded search area is calculated for the geographic location of the user. Using the expanded search area, a second set of geographical locations of interes are identified within the expanded search area. Spatiotemporal data is mapped to a first set of geographic locations to produce a first set of local data source jurisdictions and to a second set of geographic locations of interest to a second set of local data source jurisdictions. Additional geographic related reference data is applied to the spatiotemporal data for the second set of geographic locations of interest for the second set of local data source jurisdictions. A weighted relevance of the second set of local data source jurisdictions is determined from the applied additional geographic related reference data. A relative value in searching for public records is quantified within each of the weighted second set of local data source jurisdictions relative to a search cost. An optimized search of public records is performed in the first set of local data source jurisdictions and a selection of the second set of local data source jurisdictions based on the quantified relative value.

Figure 17:
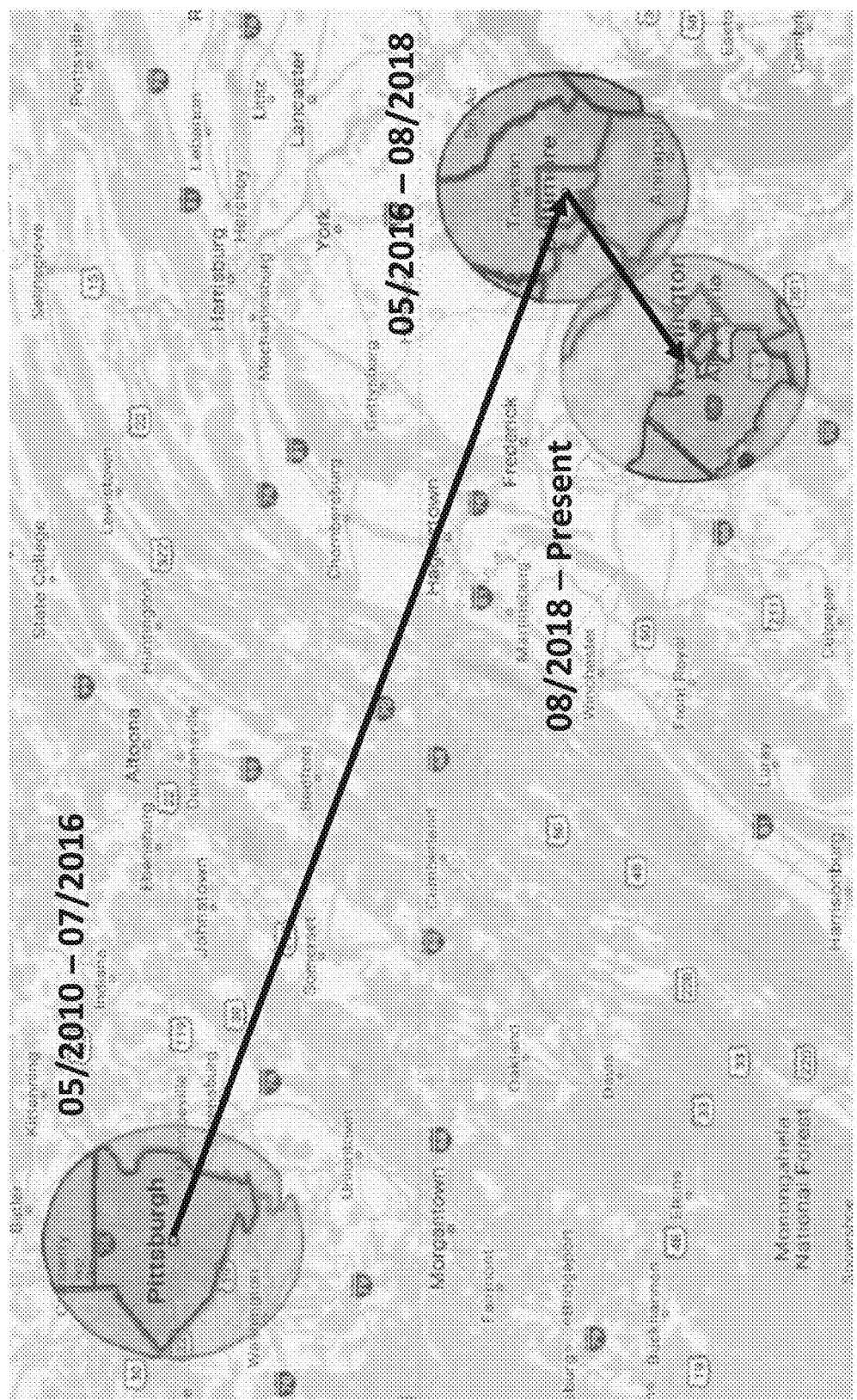
FIG. 17 illustrates a linked geographic search area.

FIG. 17 illustrates a user's geographic locations derived from biographic information. A search radius is expanded around each geographic location for the potential for an expanded search of public records as explained above.

Figure 3:
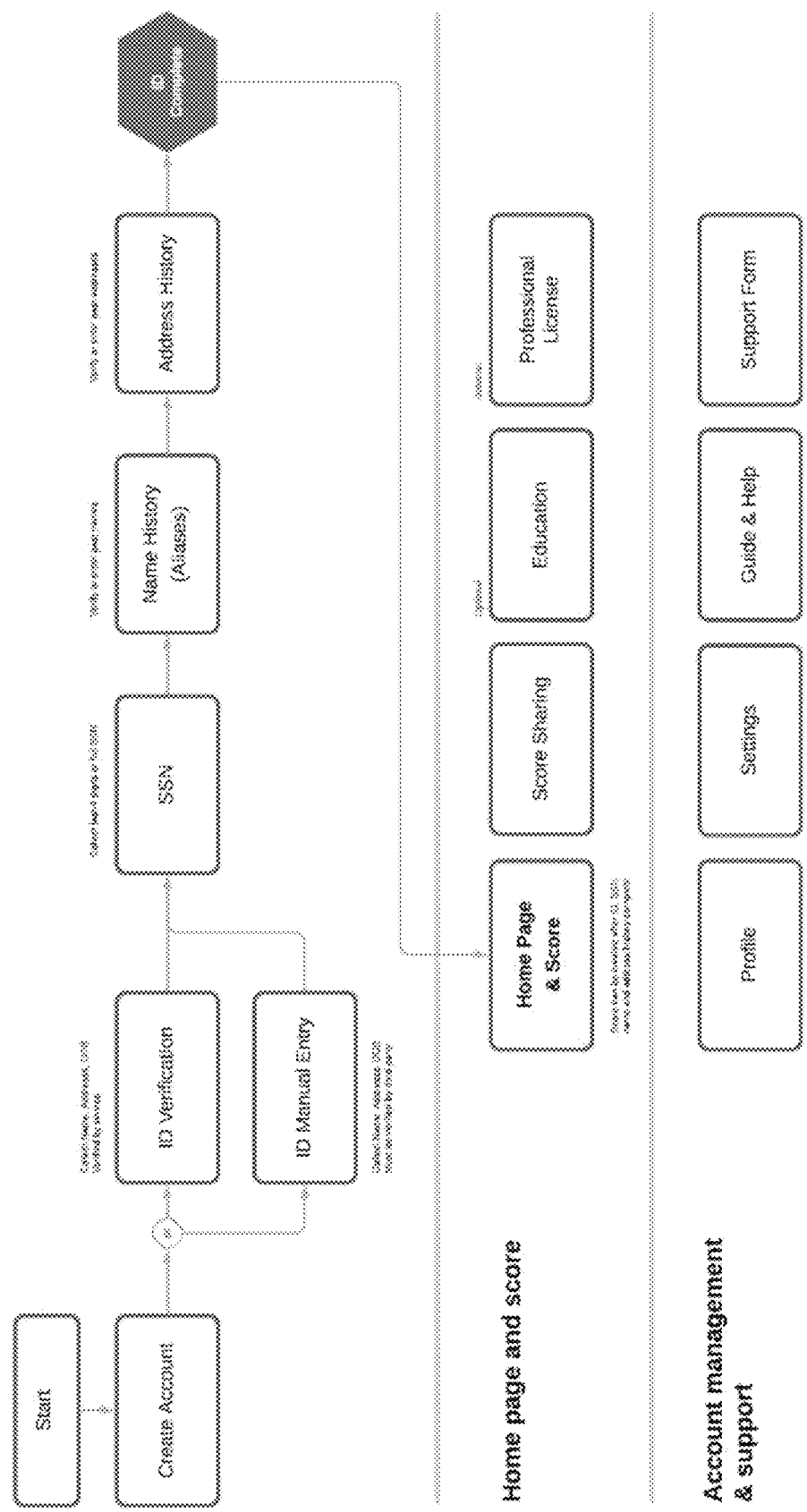
FIG. 3 is a flowchart for a trust assessment process.

Referring to FIG. 3, a more detailed explanation along with the user experience is explained in the following description. The user creates an account (Account) 44 and enters personal and biographic identification information. The user identification (ID) is verified 46 by comparison to publicly available biographic information or by a third-party service. In the event that automated ID verification. With verification complete, the user's social security number (maybe only the last 4 digits) is accessed and verified. The user's name history and address history are added to complete a basic user profile. Depending on result of the verification process identifying information can be manually entered by, for example, the third-party service.

The social security number of the user is confirmed 50, name history is verified 52 and the user's address history if verified 54. Once these user biographical information is verified the identification process is complete 56.

Once this is complete, the user can the access their homepage 58 to view basic information and an overall risk score. The homepage includes several optional features. For example, the user can decide if they want to share their risk score with another person or entity, referred to as score sharing 60. Other use profile information can be made available, such as, for example, education 62, professional licenses, education 64, etc.

Account management features are available to the user. For example, the use may access and/or update their profile 66. Settings 68 are available to turn on/off particular features. User help and a guide 70 is available and support contact information 72 is also provided.

Account Creation and ID Verification

Figure 4A:
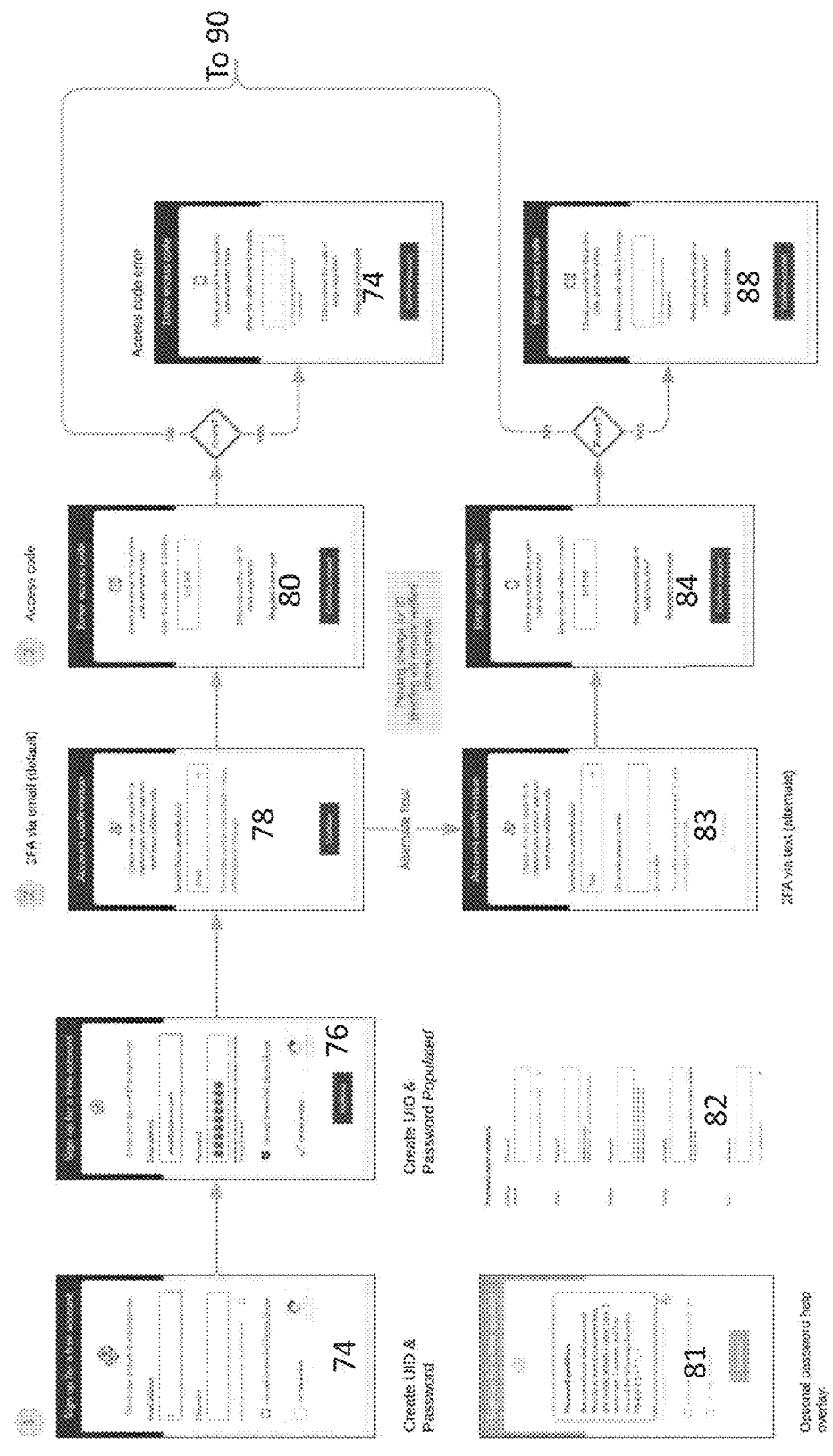
Figure 4B:
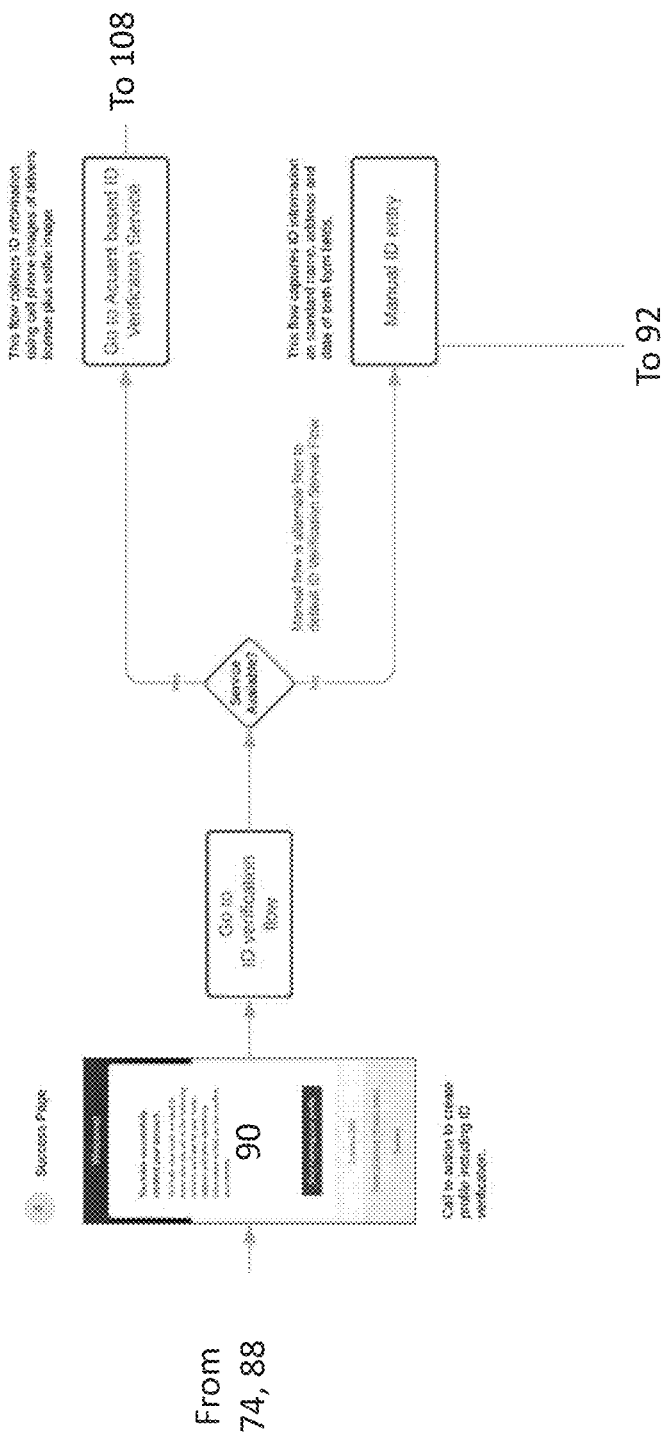
Figure 4D:
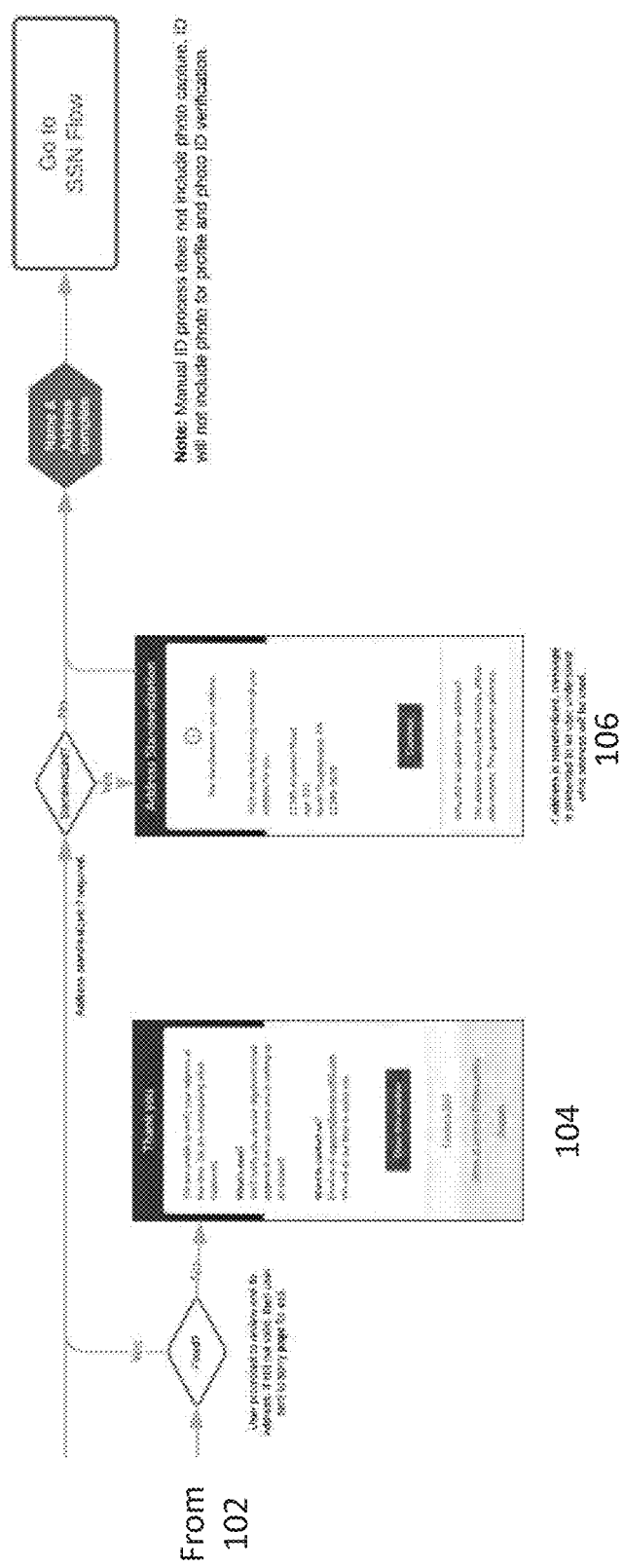

Referring to FIG. 4A, the following steps provide a more detailed explanation of account creation and ID verification.

In step 74, the user is prompted to enter an email address and password and to agree to terms of use. The user identification (UID) and password are populated in step 76. The UID can be verified by sending a verification code via the user's email in steps 78 and 80 or by text to their mobile phone account in steps 82 and 84. If there is an error in submitting the verification code the process can be repeated in steps 86 and 88 to complete the verification process and proceed to a "success" page 90.

If the automated verification process cannot be completed, user ID verification can be completed manually in steps 92-106. Once basic account is completed additional information is collected to verify the user's identity.

ID Verification

Figure 5A:
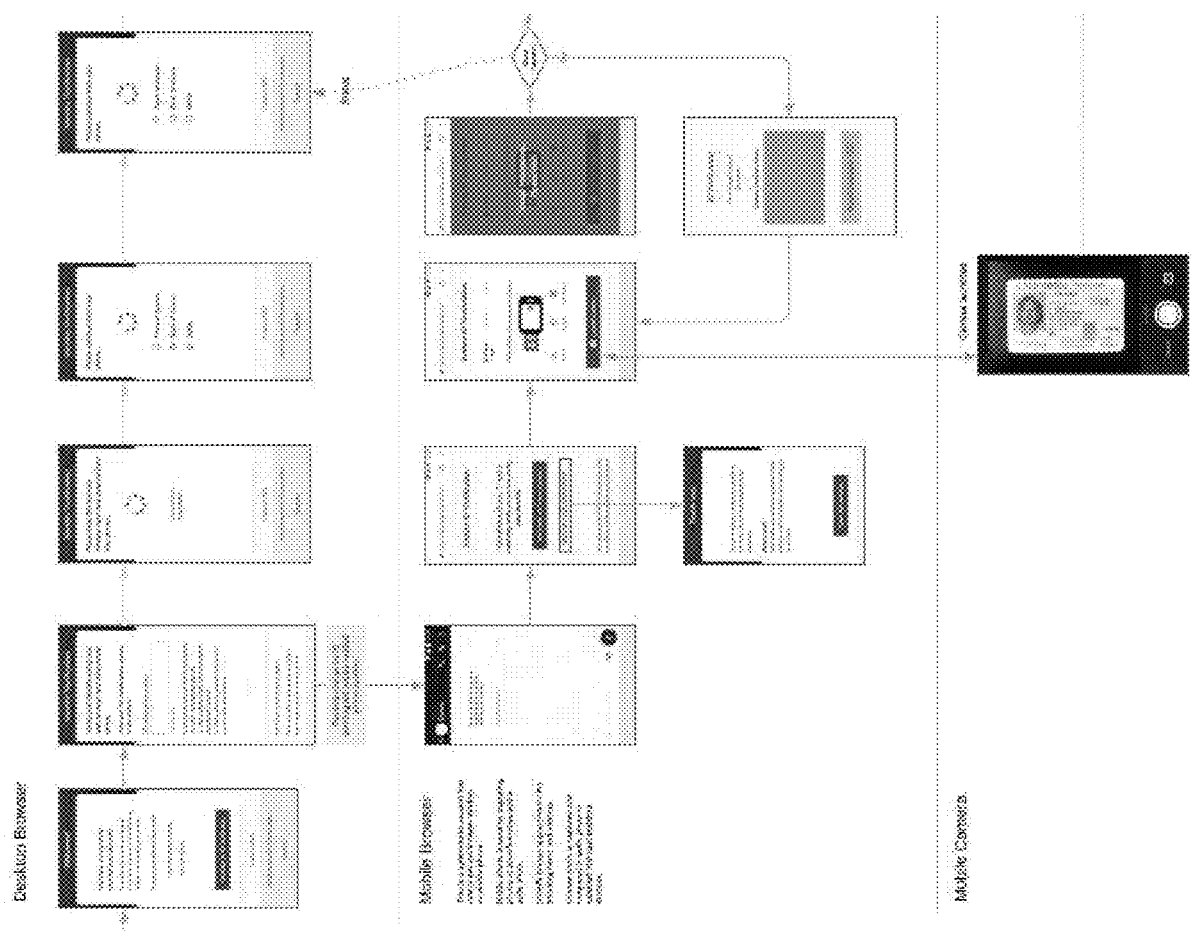
FIGS. 5A and 5B are flowcharts for and identity verification.
Figure 5B:
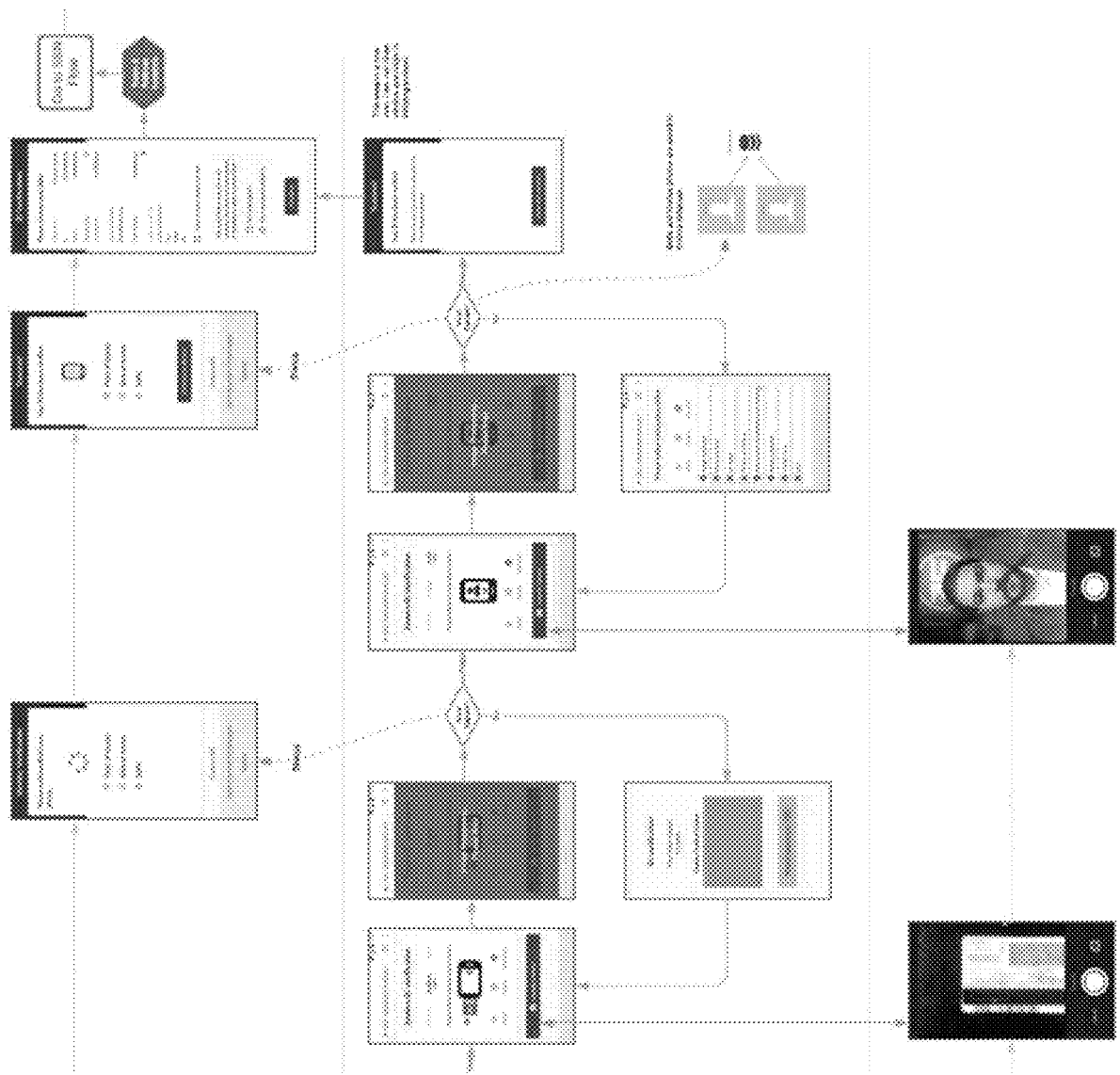

Referring to FIGS. 5A and 5B, the user is prompted to take front and back images 150, 152 of their driver's license and a headshot or "selfie" 154. This can be performed via a desktop browser in steps 108-120 or via mobile browser in steps 124-148. Personally identifying information from the license is compared to data that is already collected to verify the user.

Social Security Number Verification

Referring to FIG. 6, the user's social security number ("SSN") is used to for further verification in steps 158-168. The user is prompted to enter the last four (4) digits of their SSN 158. Identifying information from the user's SSN is used to match the user with information input by the user. The SSN must match the user identity input.

Name and Address History

Figure 7:
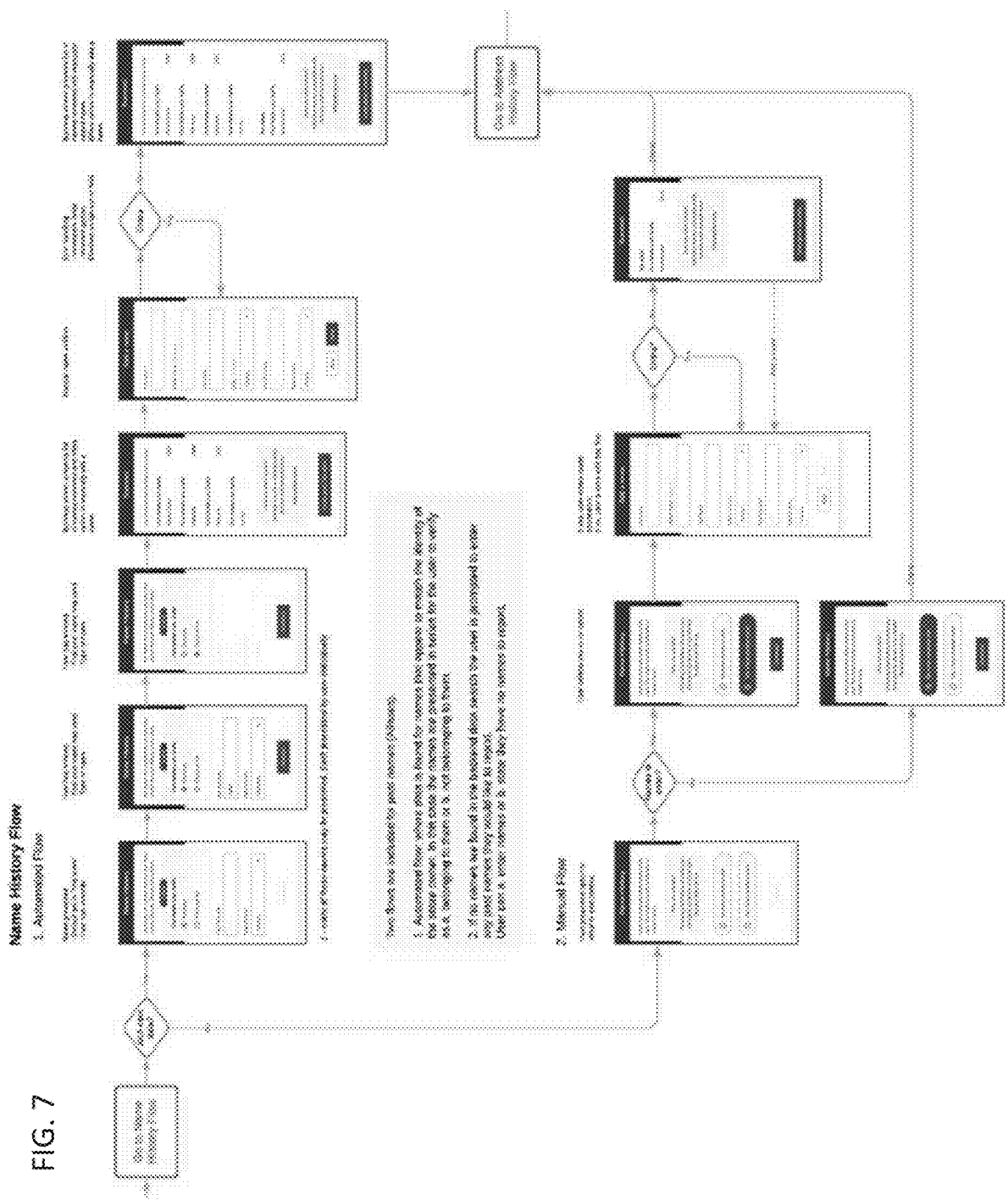
FIGS. 7-8 are name history flowcharts.

Referring to FIG. 7, the user's name history is analyzed and verified in steps 170-190. If data is found for names that appear to match the identity of the owner, the user is presented with a series of names for the user to verify or reject. If no names are found in the backend data search the user is prompted to enter any past names they would like to report in steps 182-290. The user can select a particular name or set of names that form their identity that does not conflict with verifying information.

Figure 8:
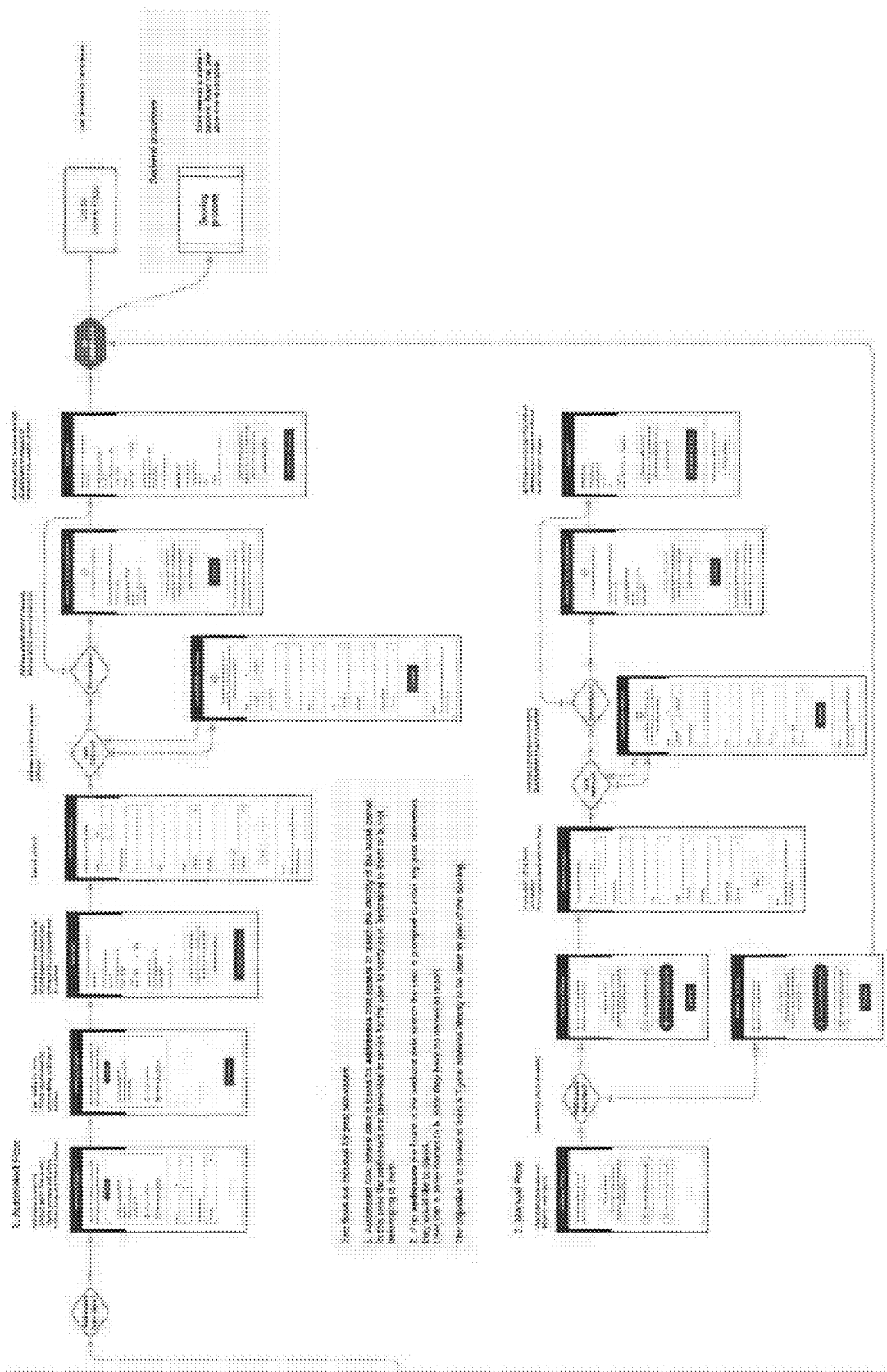
Figure 9A:
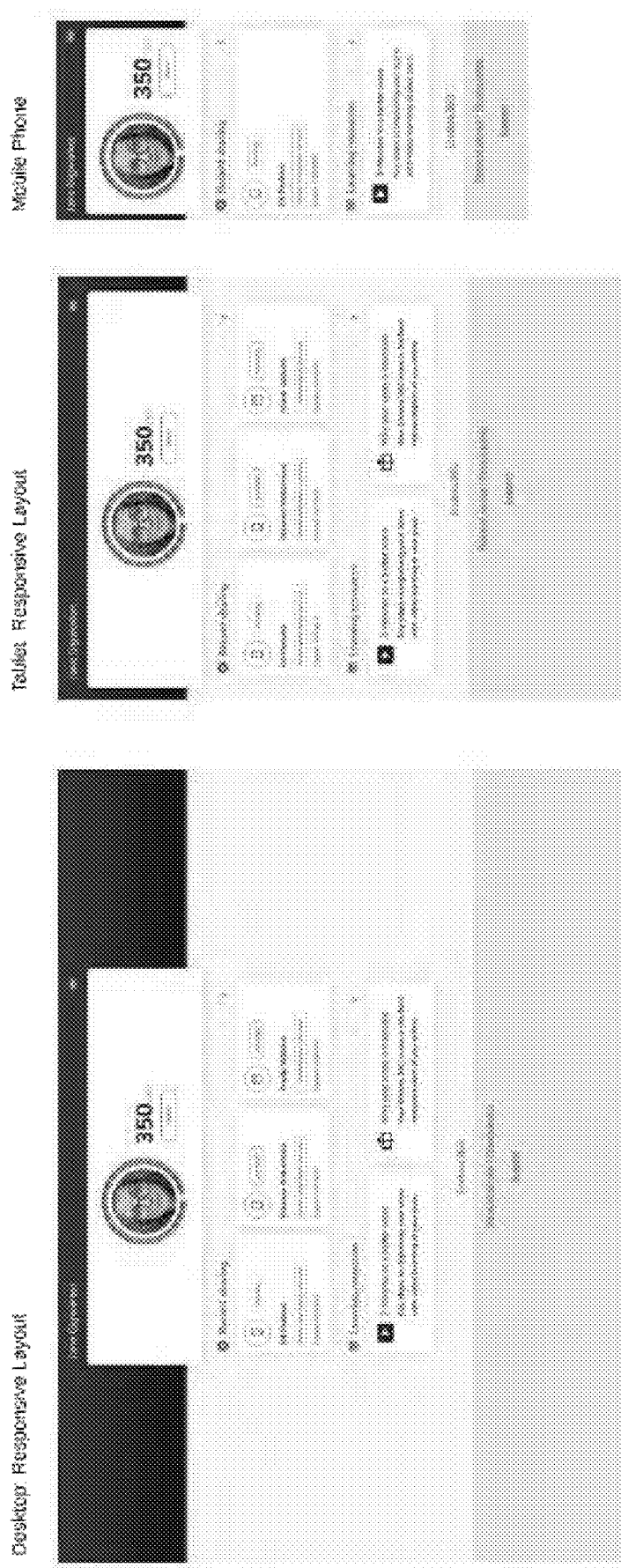
FIGS. 9A-9D are home page views.
Figure 9B:
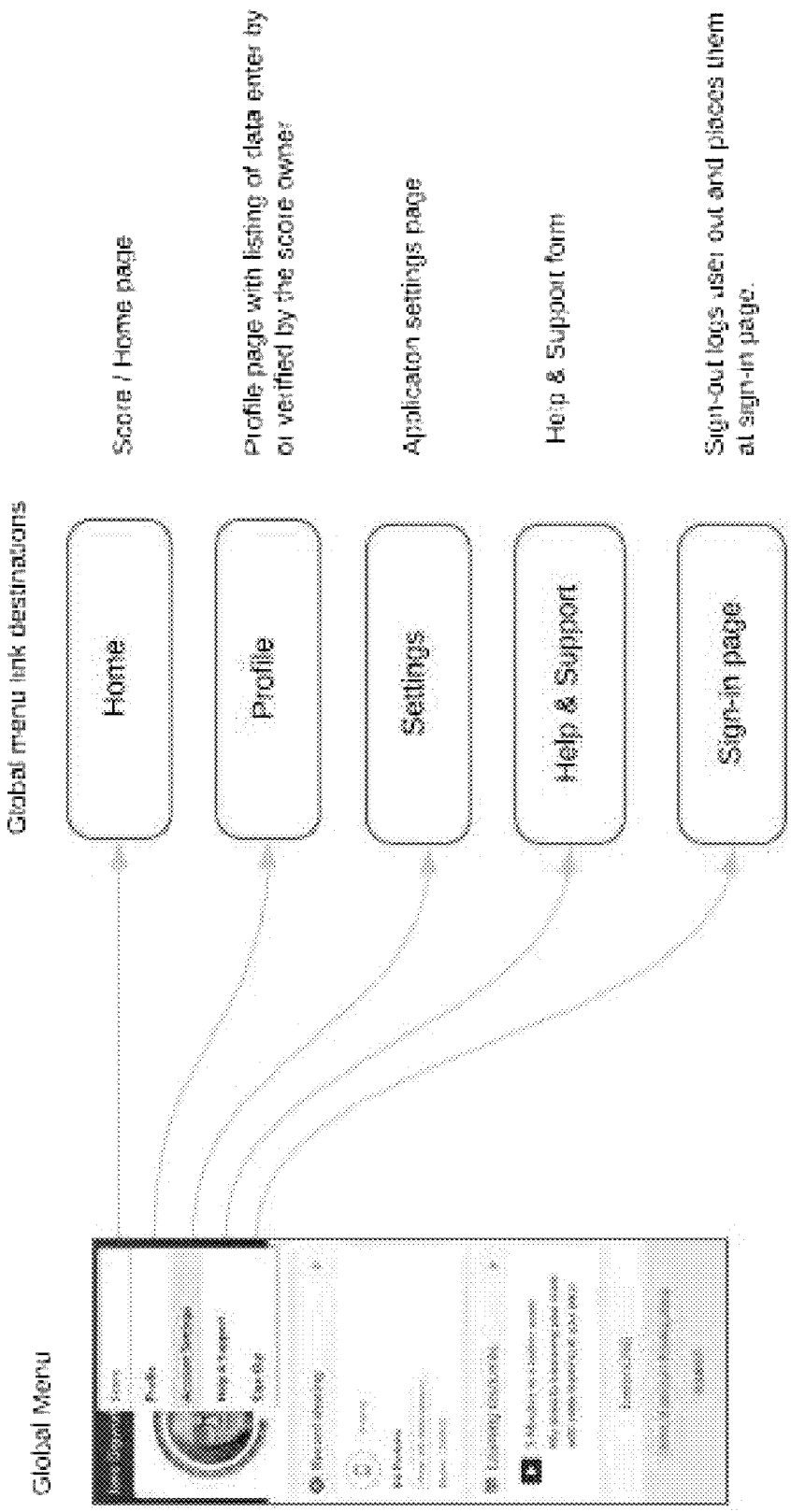
Figure 9C:
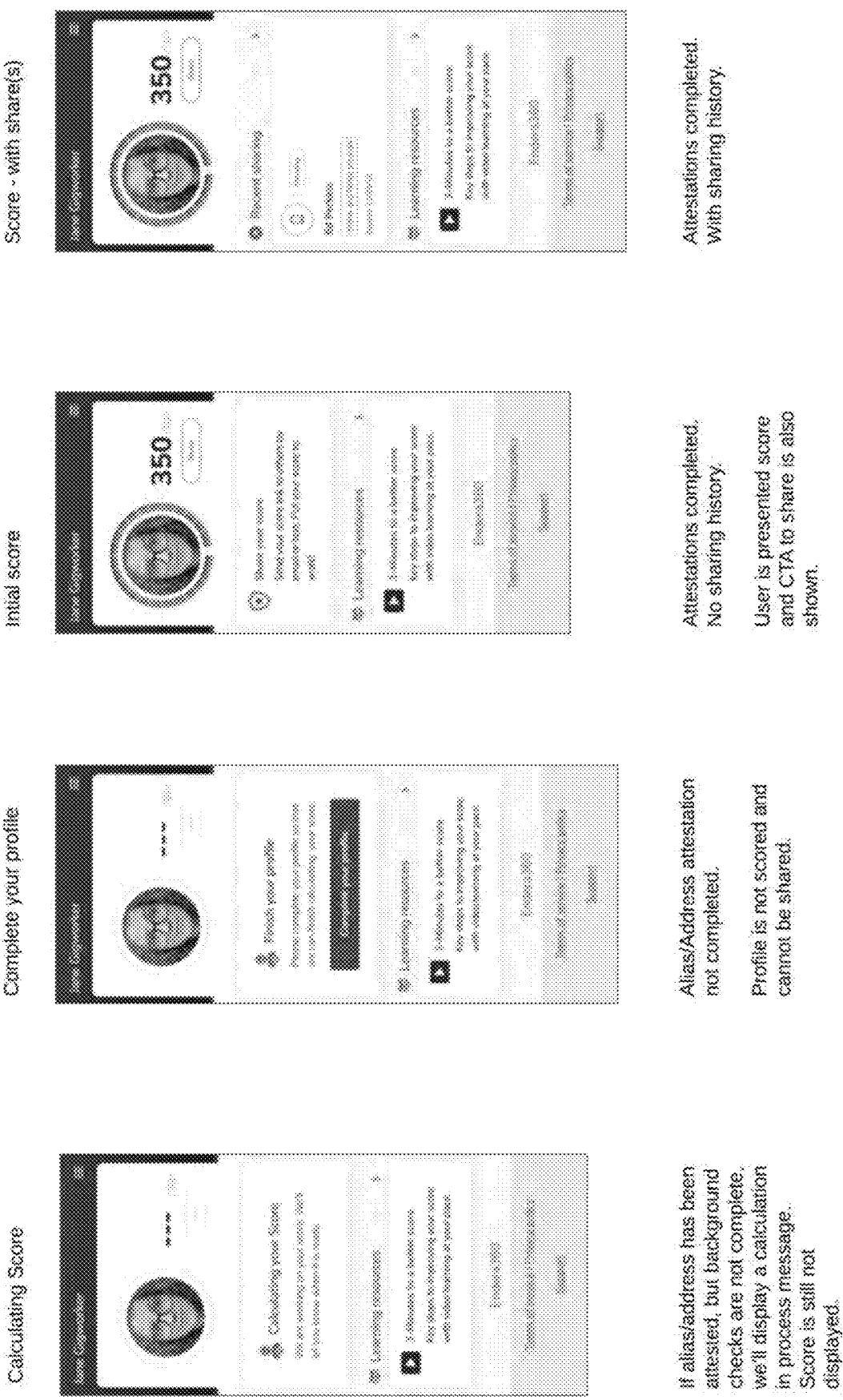
Figure 9D:
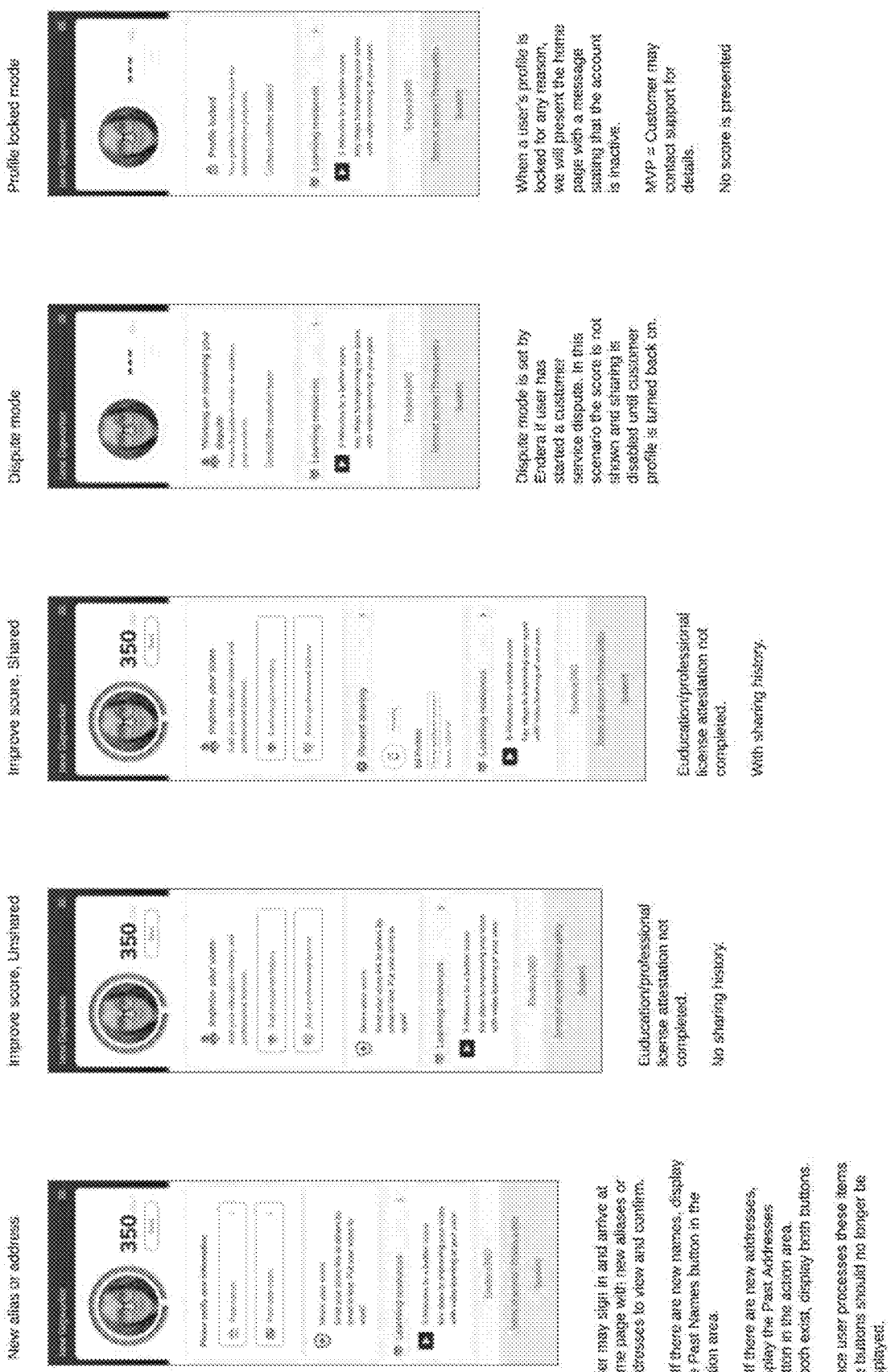

Referring to FIG. 8, the user is then presented with an address history where data is found for addresses that appear to match the identity of the score owner in steps 191-202. In this case the addresses are presented in series for the user to verify as belonging to them or not belonging to them.

If no addresses are found in the backend data search the user is prompted to enter any past addresses they would like to report in steps 204-216. The user can enter addresses or state they have no addresses to report. The objective is to create at least a 7-year address history to be used as part of the scoring. Once these steps are completed, the identity of the user is confirmed. The user is then directed to go to their homepage.

Home Page

Referring to FIGS. 9A-9D, the home page is the default landing spot for the user. Profiles require creation of an online account, starting the ID verification process.

The home page can be formatted for desktop 220, tablet 222, or mobile 224 layouts. Information included on the home page includes the user's image surrounded by a color-coded circle and a numerical risk score. The home page communicates the risk score, shows the latest state of their profile and prompts the user to complete various data processing tasks. This is done with conditional modules that link to modal flows like names history, address history, education or professional licenses.

The user has access to a menu 226 of options on the homepage that includes settings, profile, help/support and a login-page.

Home Page Variants

A variety of computations and analyses are performed in the background and the user may be updated with a message depending on the background task as shown in steps 230-246. For example, if an alias/address has been attested to, but background checks are not complete, the system displays a calculation in process message (calculating score) 230. In this case, no score is displayed.

If Alias/Address attestation is not completed the user profile is not scored and cannot be shared and a complete your profile 232 message is displayed. If the profile is completed and attestations are completed the user is presented with an initial score 234. At this point the user is prompted to share their score if desired. Once the score is shared a score with share 238 screen is displayed with the user's sharing history.

When the user signs in and arrives at the home page, new information such as a new address or alias may be displayed for the user to review and confirm on a new alias/address screen 238. If there are new names, a Past Names button is displayed in an action area. If there are new addresses, a Past Addresses button is displayed in the action area. If both exist, both buttons are displayed. Once user processes these items the buttons are no longer displayed.

Improve score, Unshared 240 and Improve score, Unshared 242 screens may also be displayed. For example, if education/professional license attestation has not completed. No sharing history is displayed on the Unshared screen 240 while sharing history is displayed on the Shared screen 242.

In some cases, the user may dispute certain information provided by third-parties or may disputer their score and a Dispute mode 244 screen is displayed. In this scenario the score is not shown and sharing is disabled until the customer profile is turned back on.

User Profile

Figure 10B:
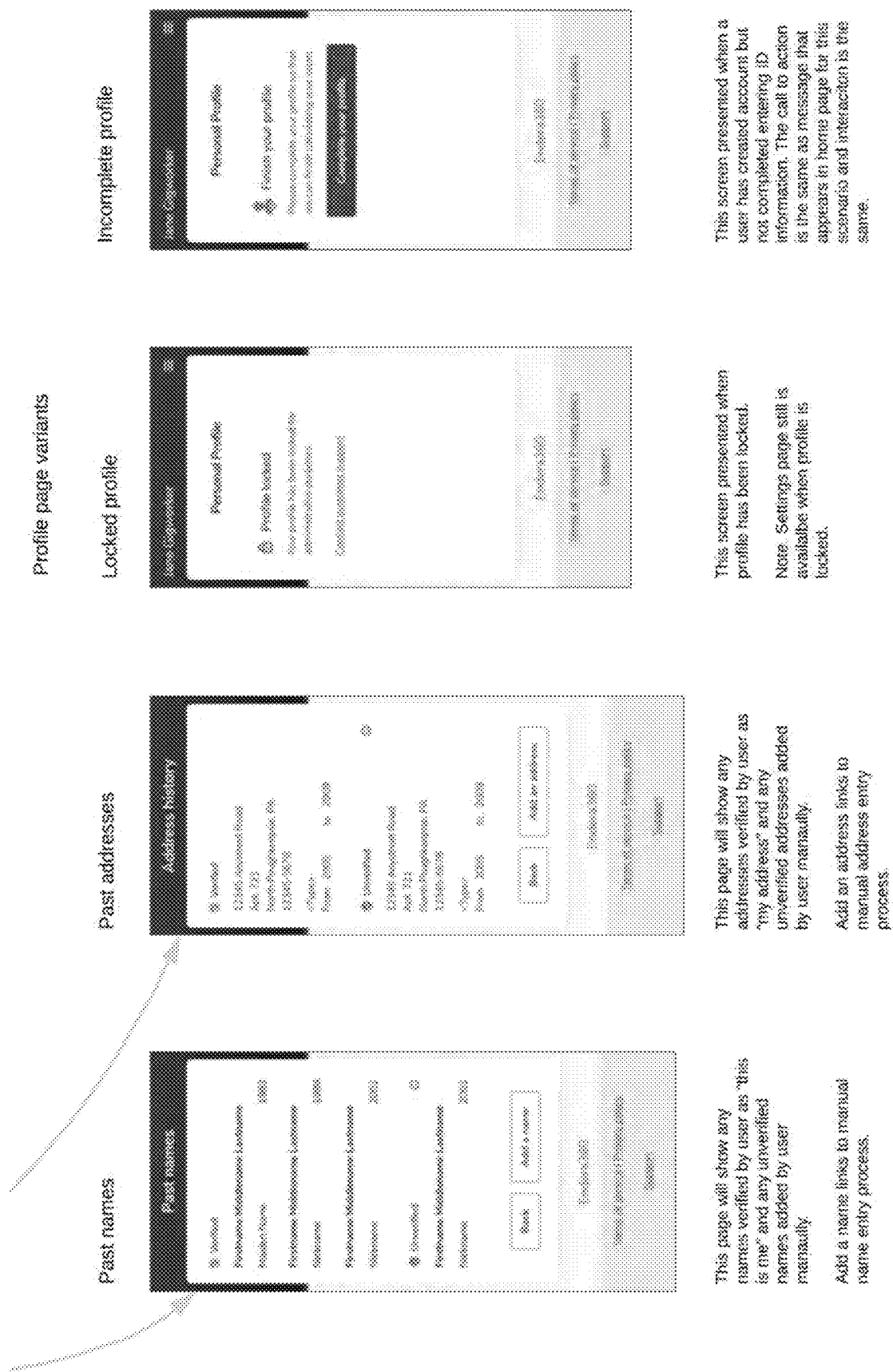

Referring to FIGS. 10A and 10B, on the profile page, the user can view all personal data that is associated with their account. This includes birthdate, redacted SSN, current address, past names and addresses, educational credentials and professional licenses. The user is flagged for any information that has not been verified. The user can click on particular information to get more information on personal data, such as, for example, educational credentials.

Settings

Figure 11:
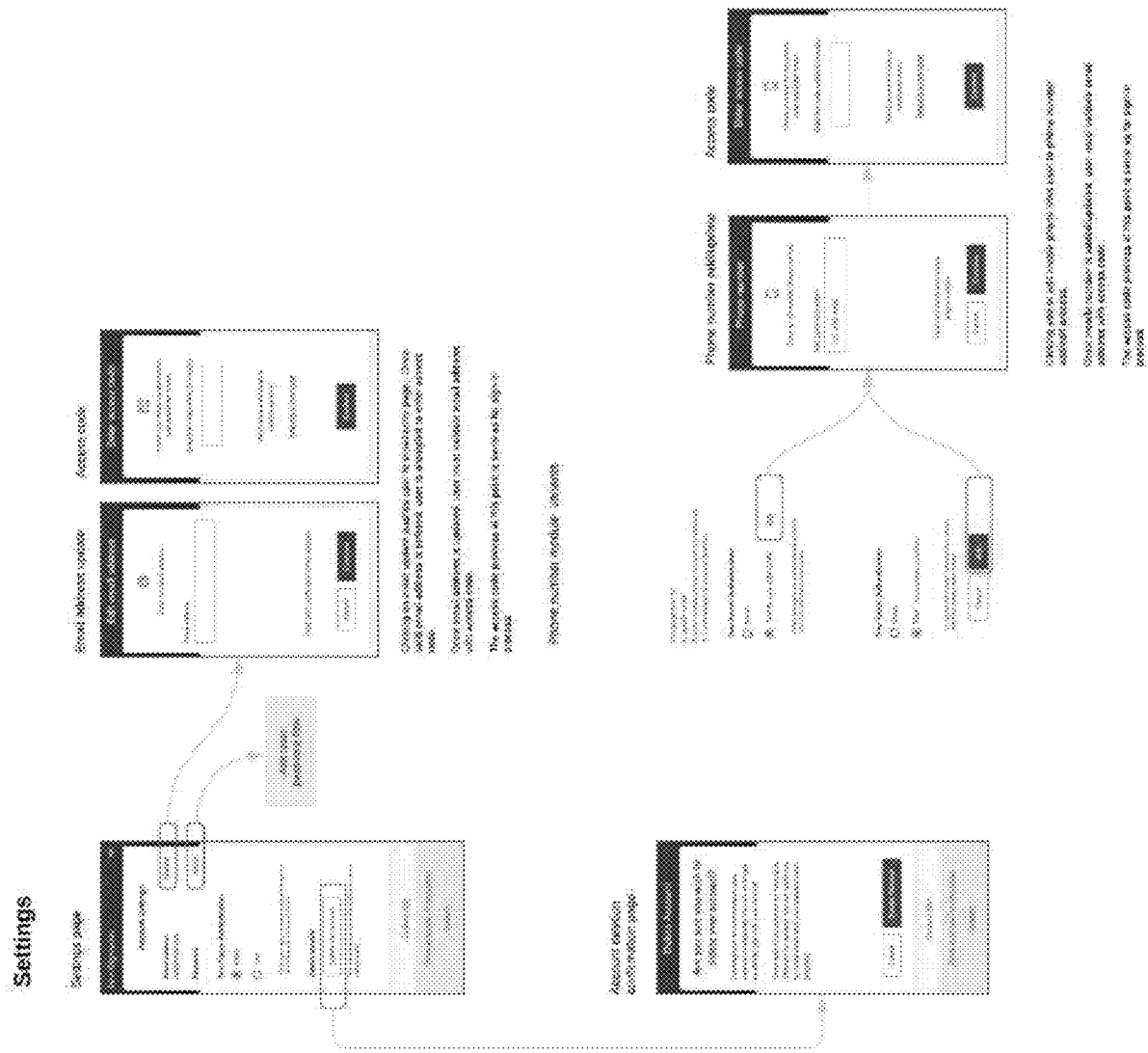
FIG. 11 is a view of settings.

Referring to FIG. 11, on the settings page, the user can update particular information such as, for example, e-mail address, cell phone number and password. The user can also choose how to verify a valid user by e-mail or text code verification. The user can also delete their account on the settings page.

Help and Support

Figure 12A:
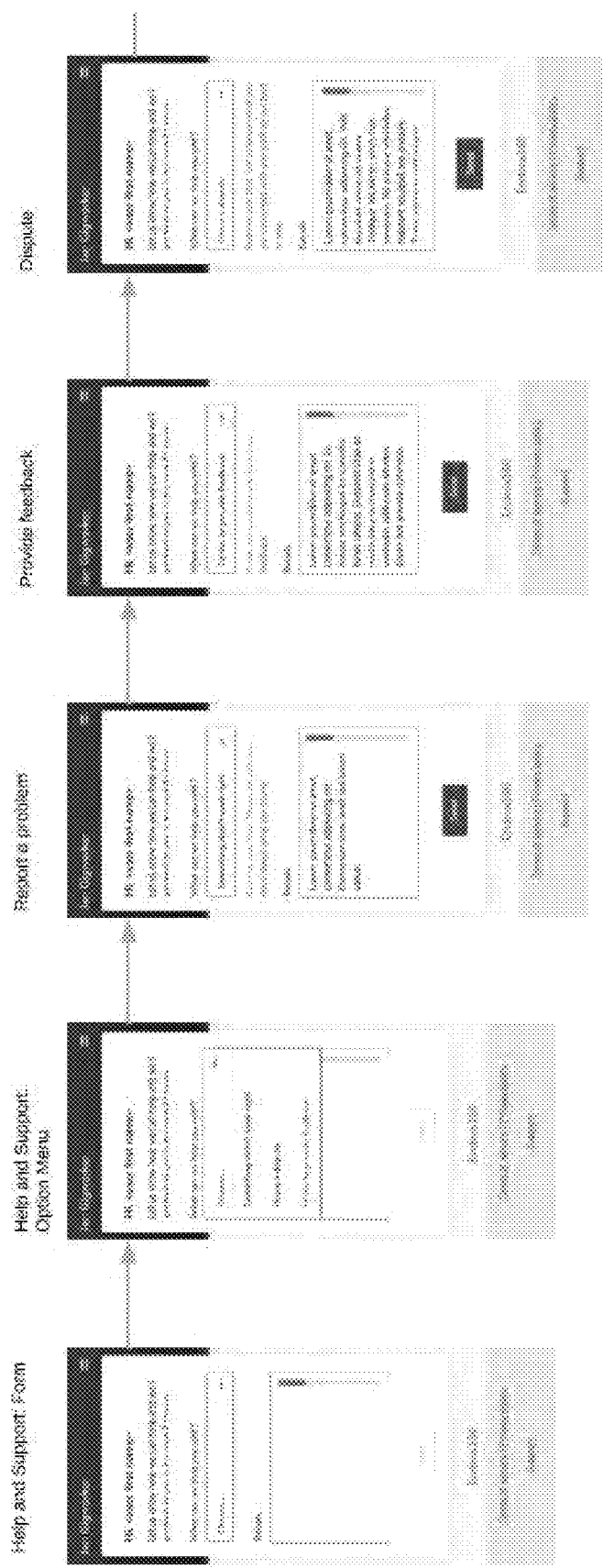
FIGS. 12A and 12B are help and support views.
Figure 12B:
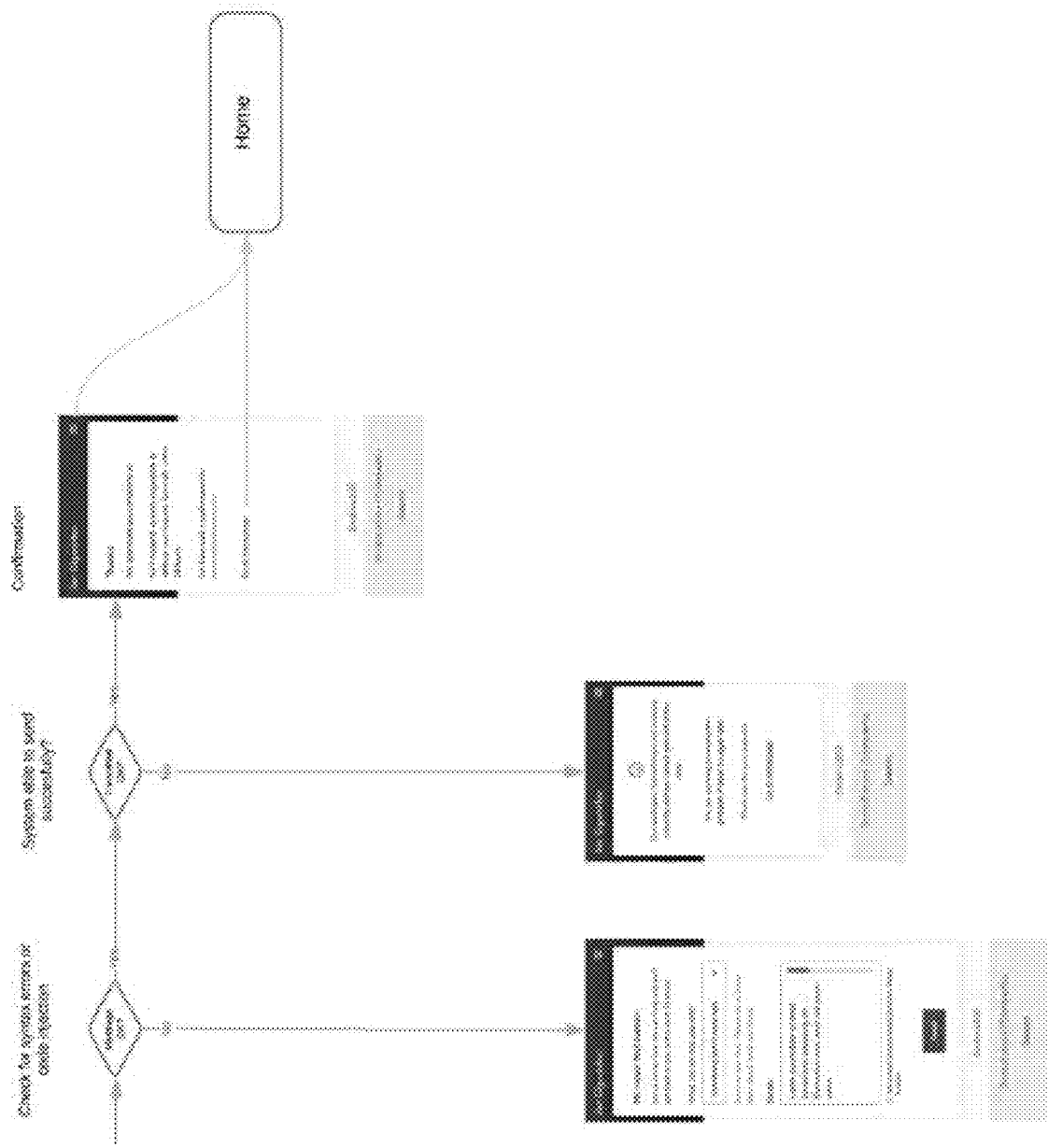
Figure 13A:
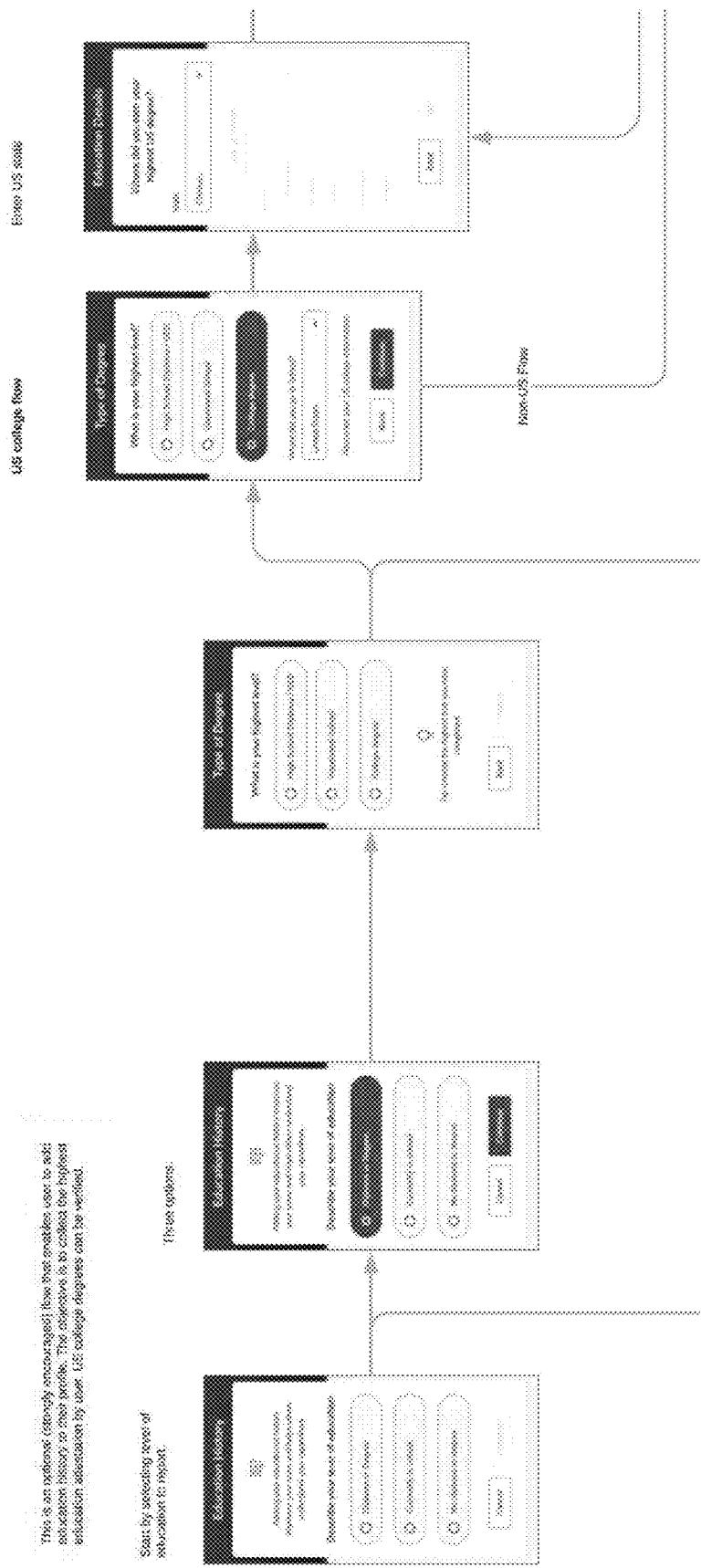
FIGS. 13A and 13D are education history flowcharts.
Figure 13B:
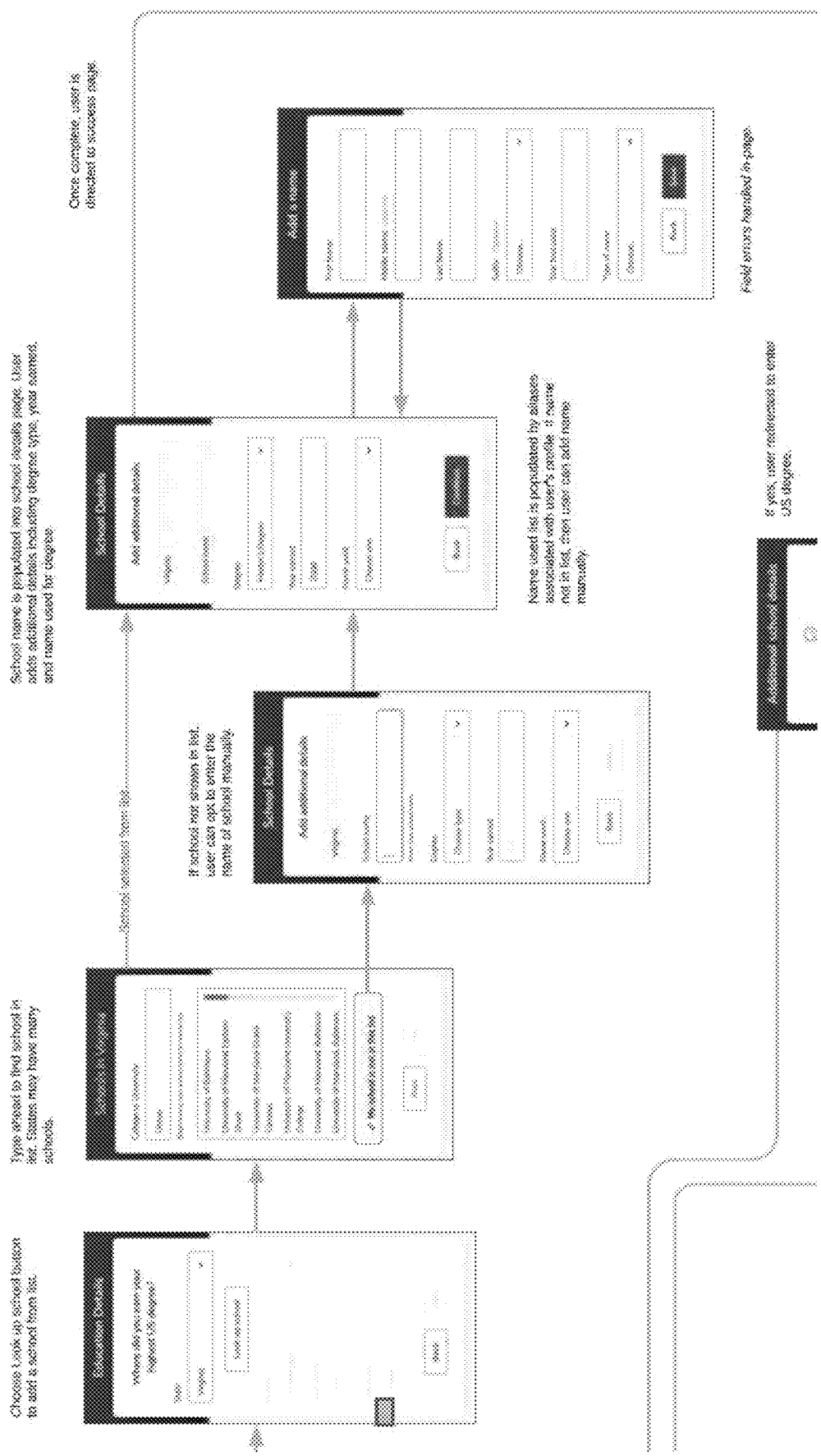
Figure 13C:
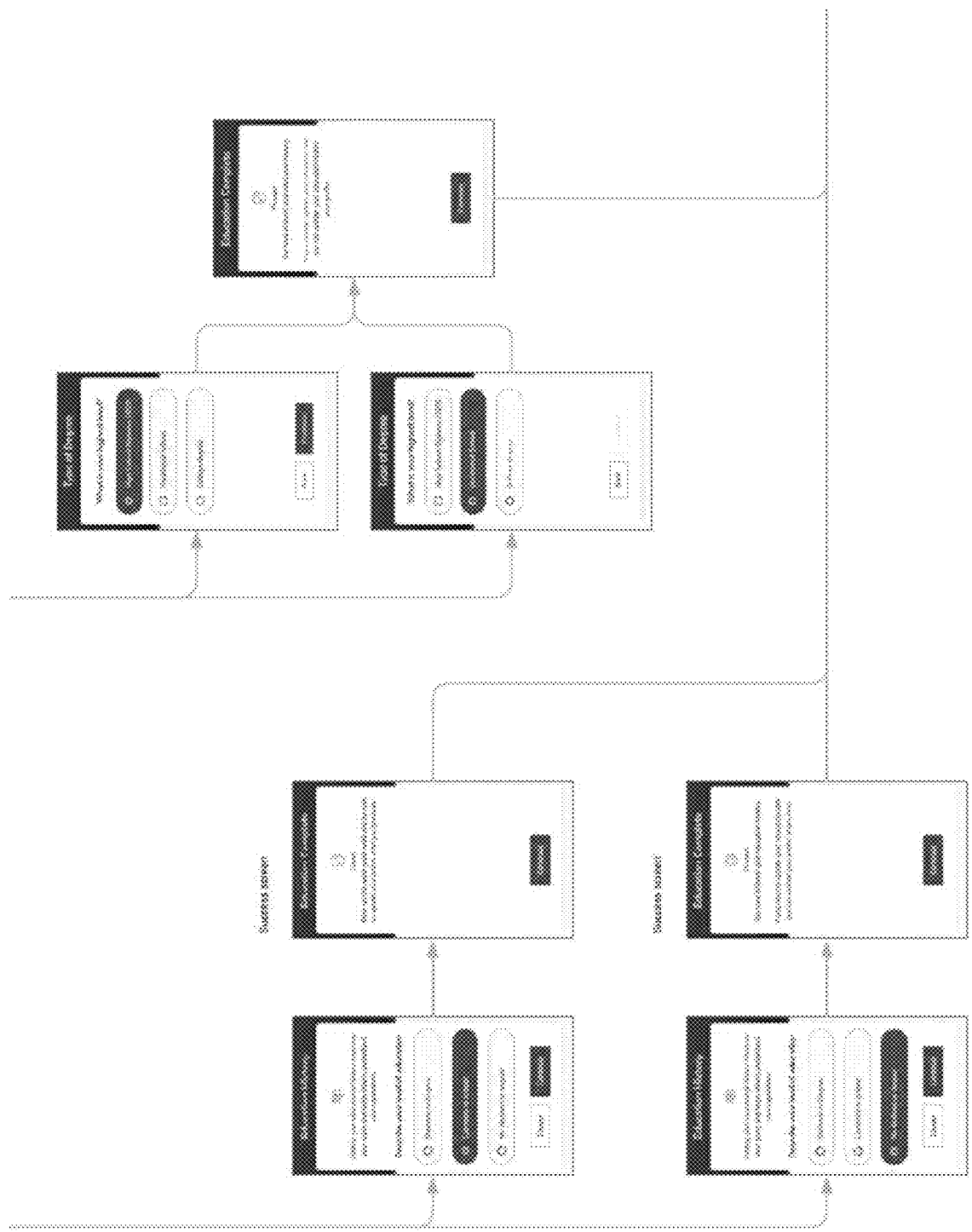
Figure 13D:
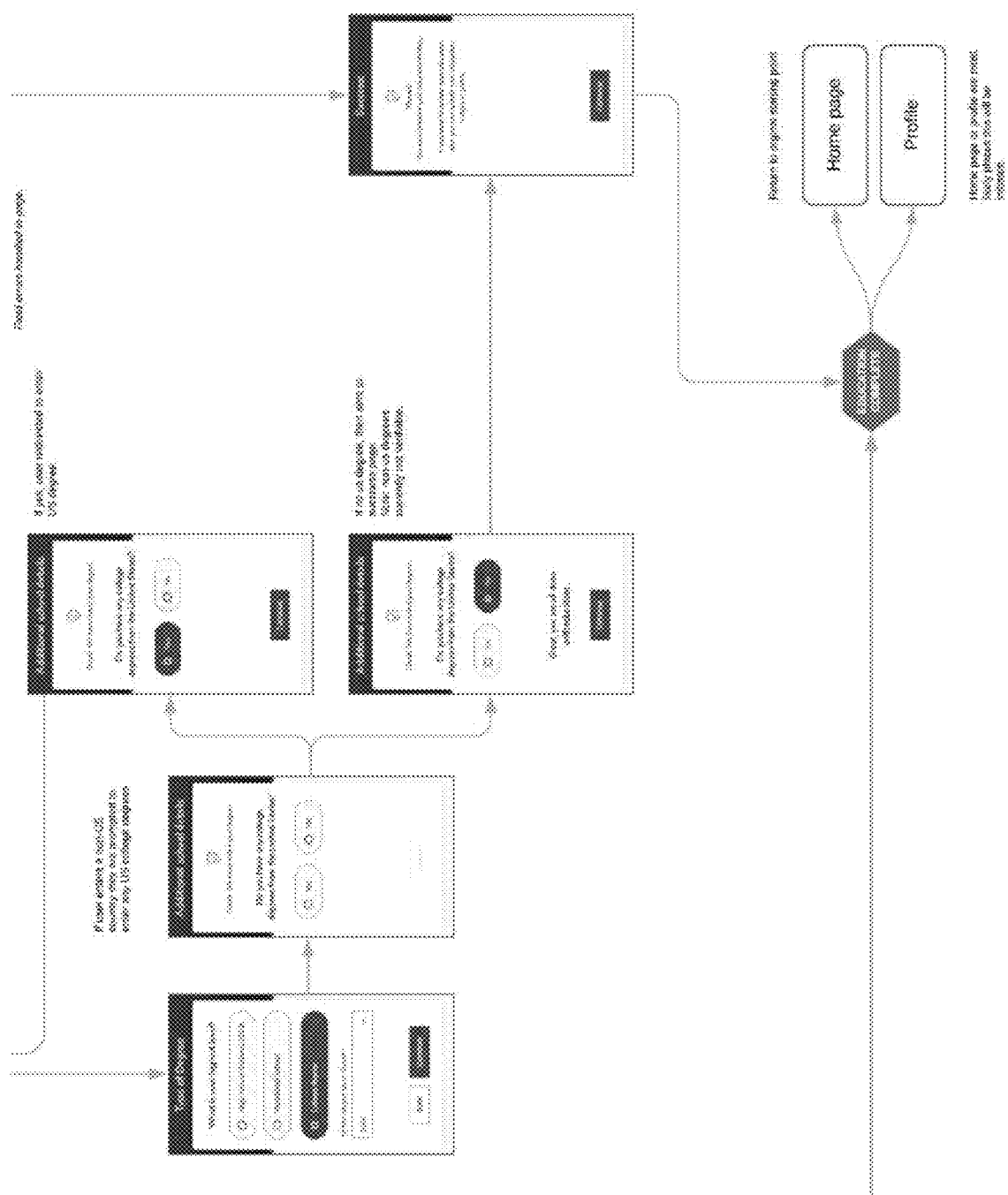

Referring to FIGS. 12A and 12B, the user can go to the help and support page to get help with various issues. The user is prompted to enter a category related to the issue they need help with. The user enters details of the nature of the problem and a support technician may respond immediately as available or within 24 hours.

Education History

Referring to FIGS. 13A-13D, depending on the user's preference, details of education history can added to the user's profile. The user is prompted to enter any diplomas or degrees and any educational courses in progress. The user is prompted to enter highest education level, such as high school, college and/or post-graduate. Through a series of menus the user identifies each school, dates of attendance and degree achieved.

Once the educational profile is complete, through the terms of use, the user agrees that the system will verify the entered educational information.

License History

Figure 14A:
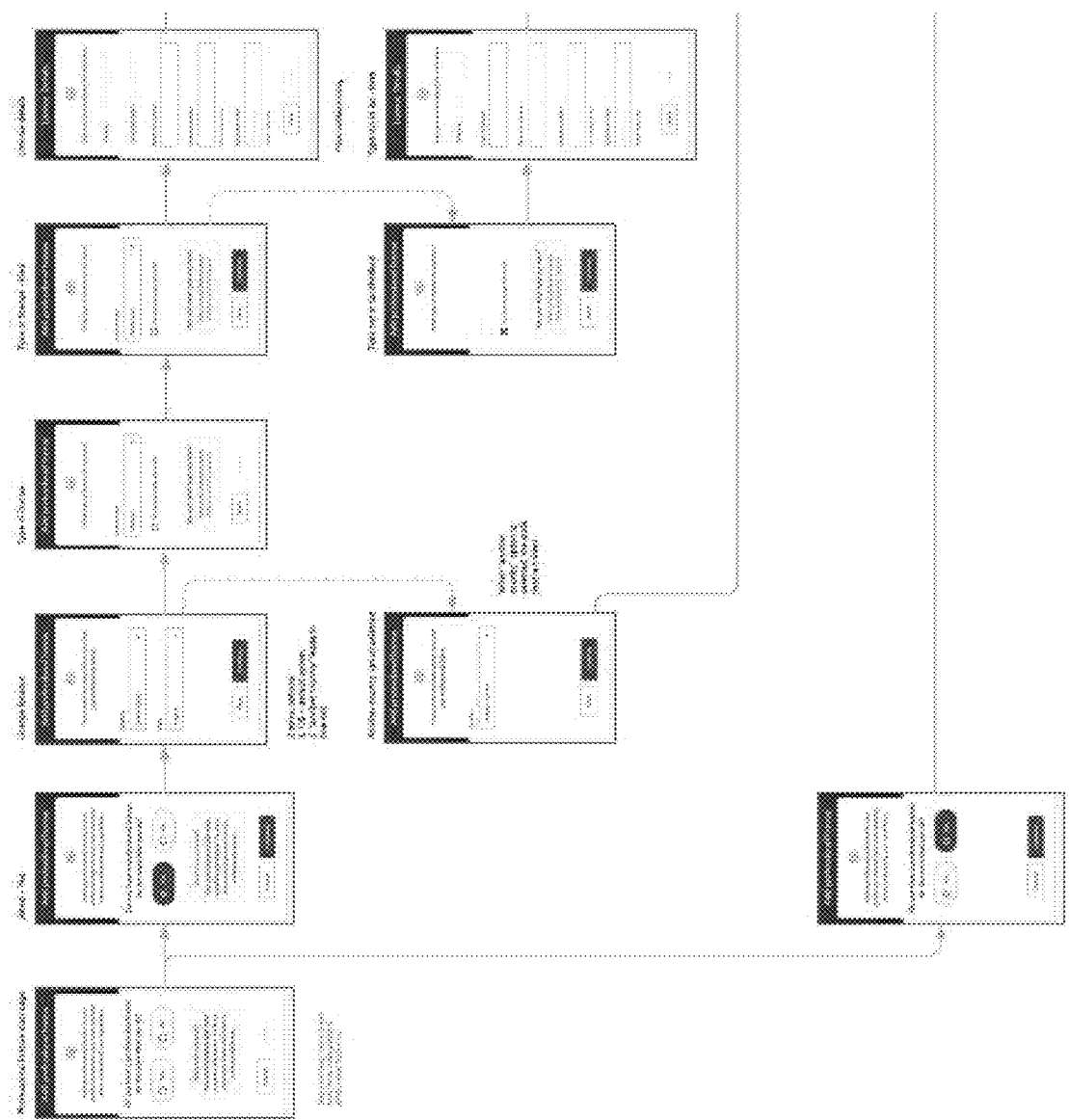
FIGS. 14A and 14B are professional license flowcharts.
Figure 14B:
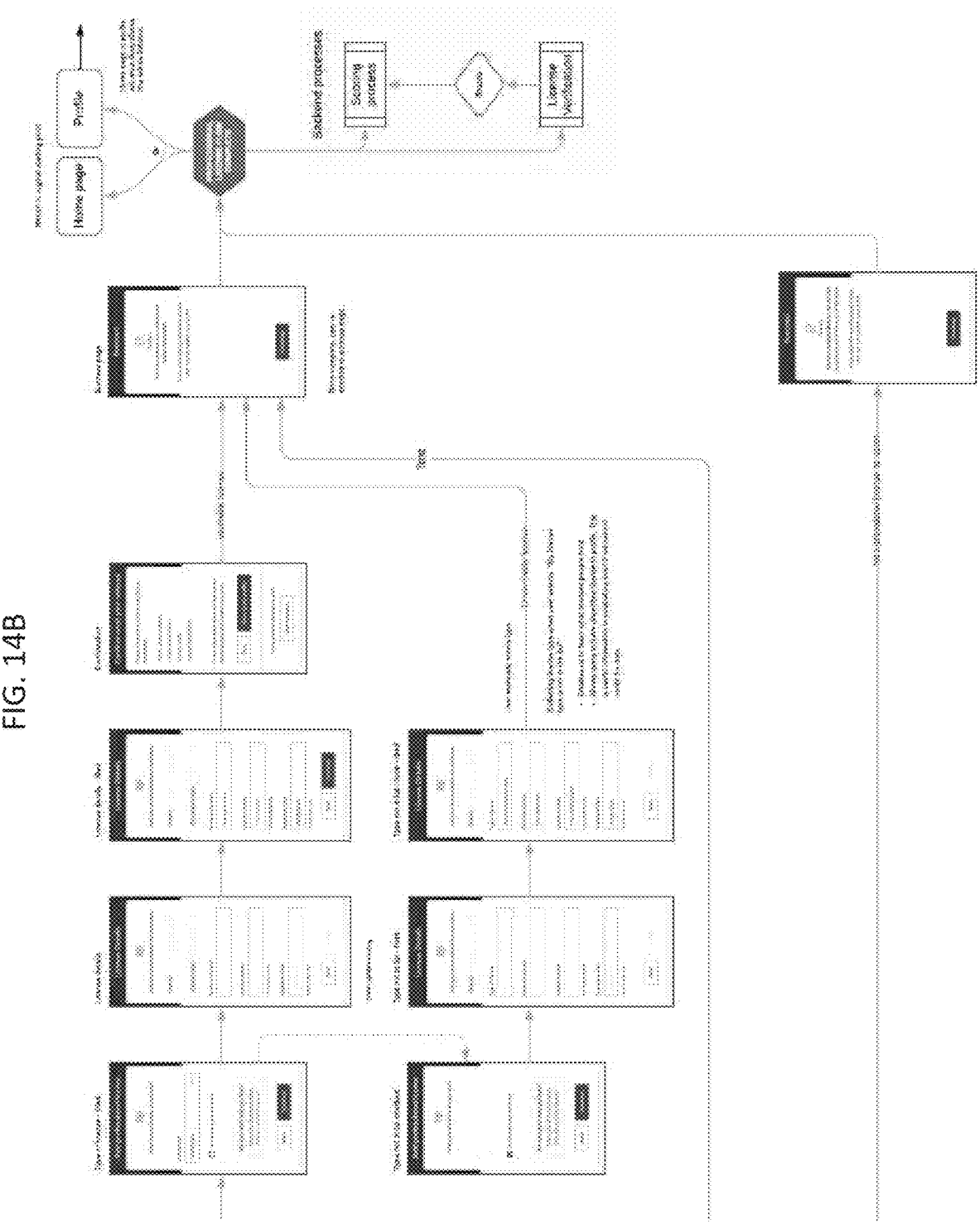

Referring to FIGS. 14A and 14B, the user can enter their professional license information in their profile. This includes the type of license, date achieved and location. Other license details may also be entered. Once again, the user agrees that license information will be verified.

Owner Sharing

Figure 15B:
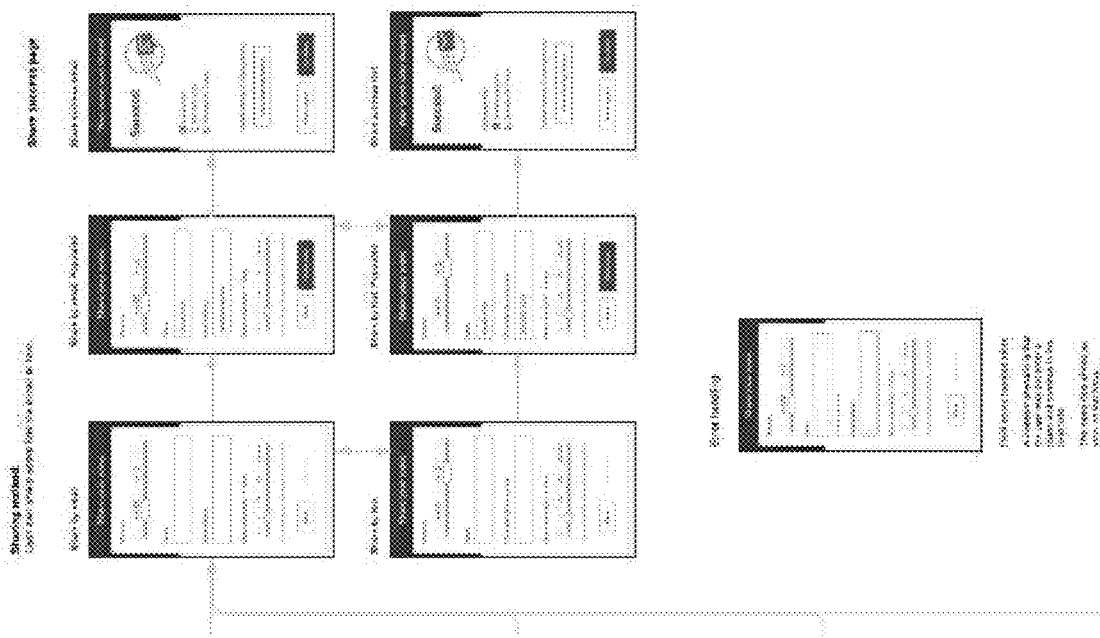
Figure 15C:
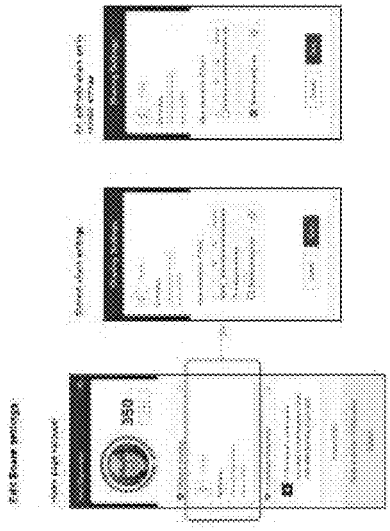
Figure 16A:
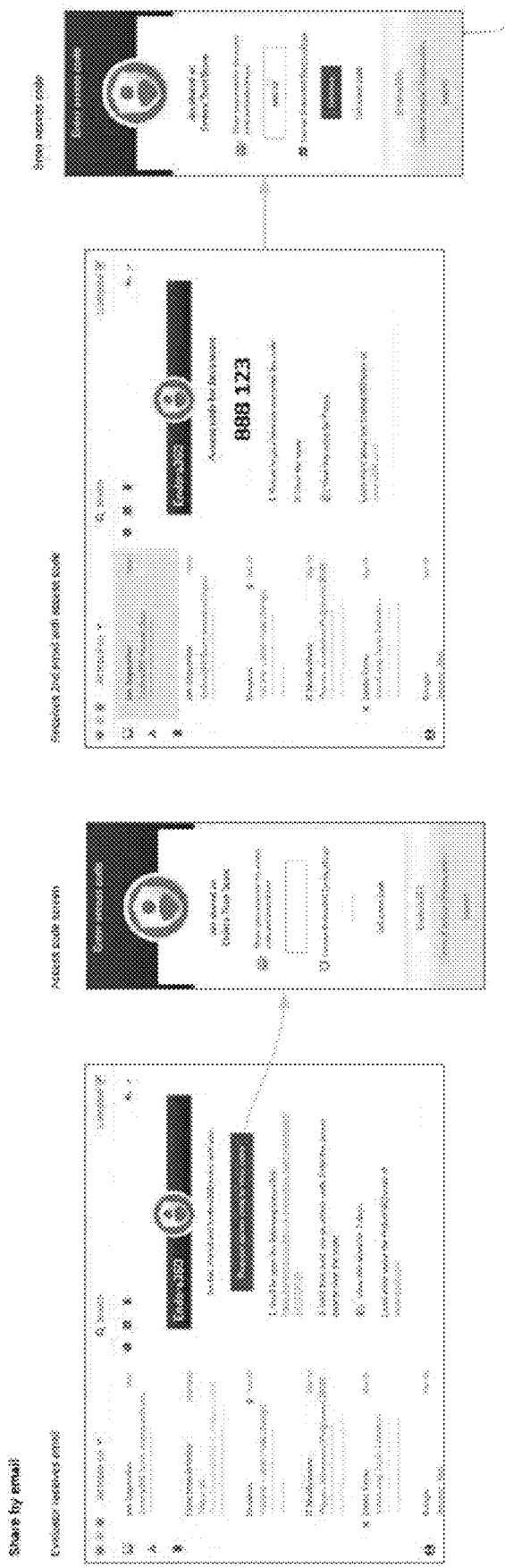
FIGS. 16A-16E are evaluator sharing views and flowcharts.
Figure 16B:
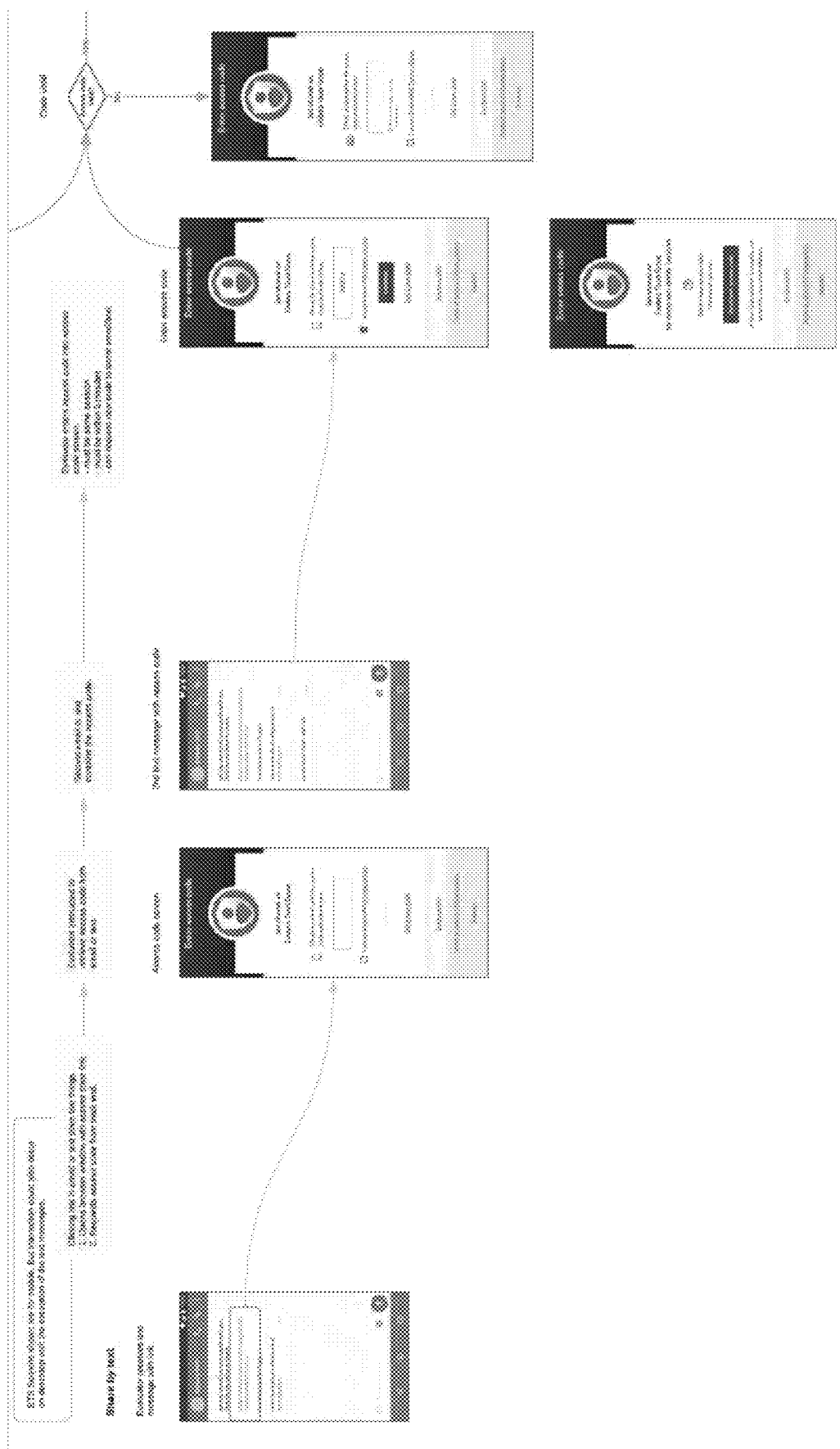
Figure 16C:
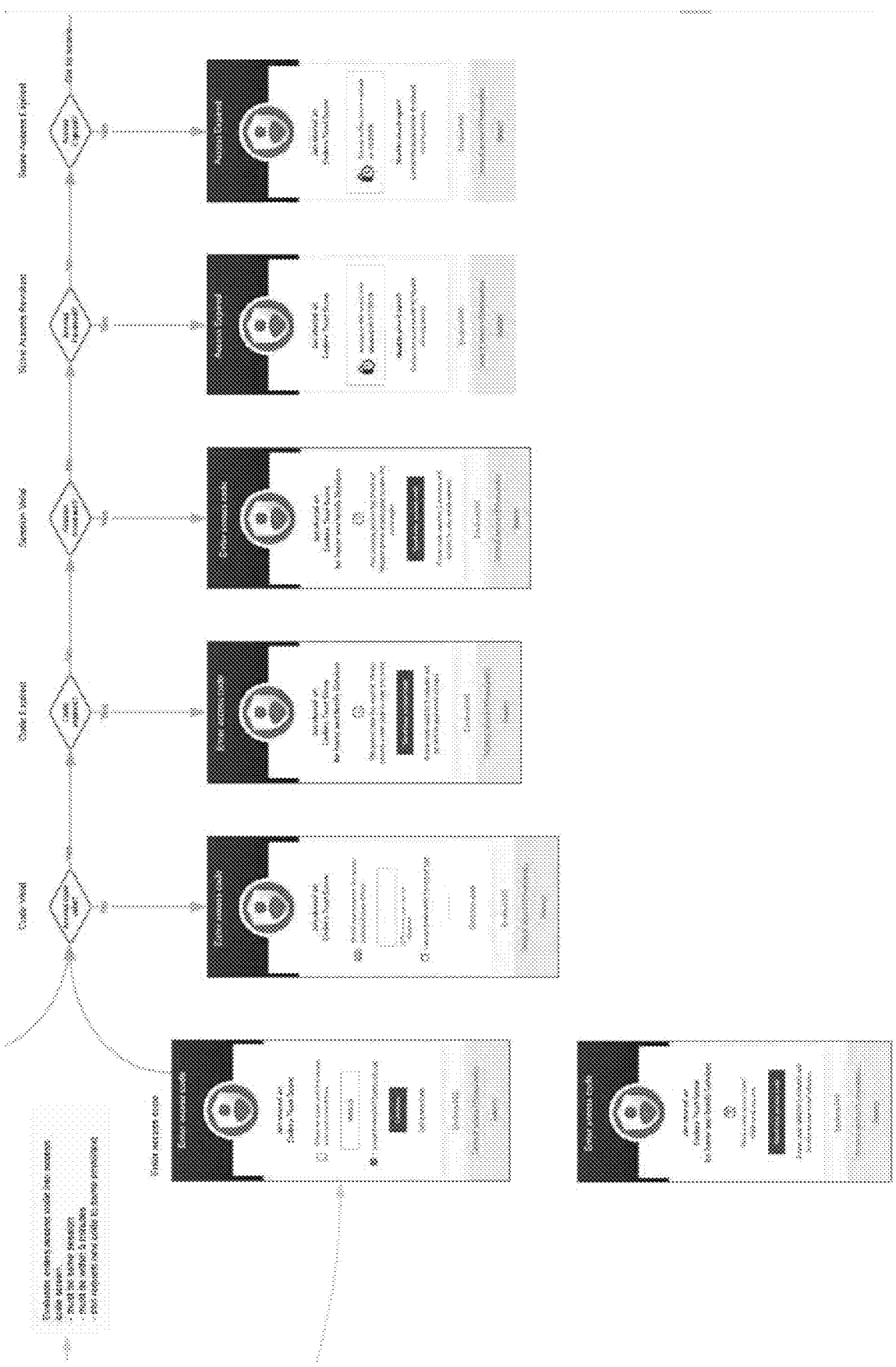
Figure 16D:
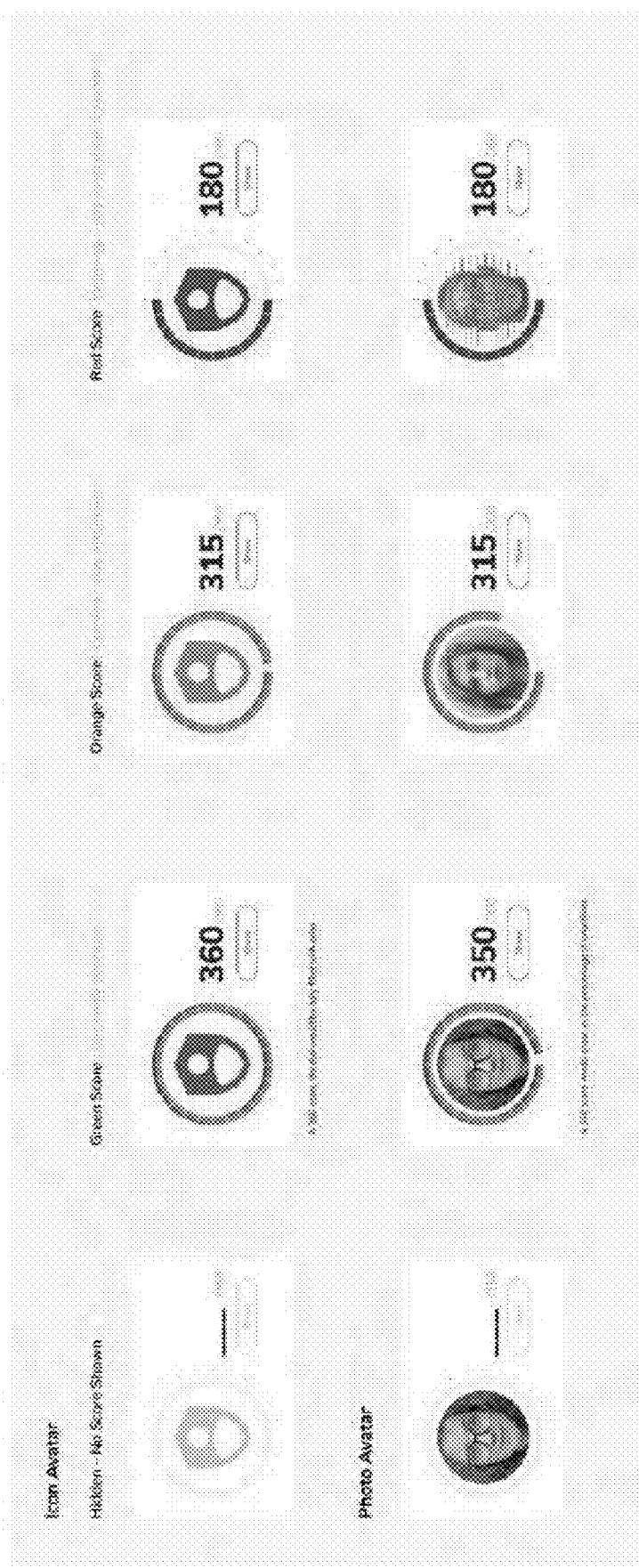
Figure 16E:
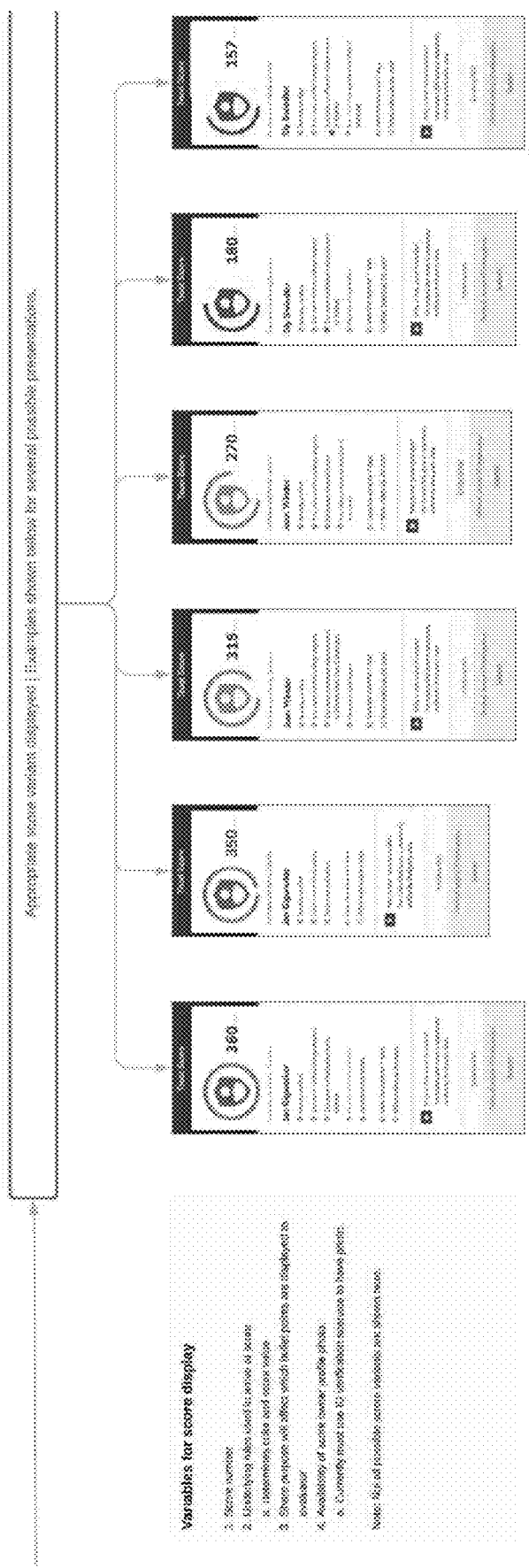

Referring to FIGS. 15A-15C, once the user's data and profile are complete, the user may share their trust information with another person or entity. The user is prompted to identify the reason for sharing. For example, the user may specify that sharing is for home and family services, professional services, a personal relationship or unspecified.

If the share if for home and family services, the users ID is verified and criminal history and licenses are shared.

The user is prompted to enter the method of sharing (email and text message), the person's name and address and the length of time for the share. Once sent the user gets confirmation that the share was successfully completed.

The user can edit share settings at any time. For example, the user may decide to change contact information, revise the share time and/or revoke access.

If the share is for a personal relationship, the share information may include identity verification, criminal background check, civil background check and educational credentials. Once again the user enters share parameters such as the person's name, contact information and length of share.

If the share is for professional services, the shared information includes identity verification, criminal background check, civil background check and verification of educational credentials and professional licenses. Another share category, unspecified, also provides the same information. The user may also provide a custom share in which the user identifies specific categories or types of information.

In the MVP the settings, individual shares can be managed from the home page share tiles. Shares are included in a tap-able carousel at the home page with the latest share first.

Tapping a share brings up a modal settings page where settings for the current share are displayed and are editable.

Referring to FIGS. 16A-16E, the evaluator receives a message that the user has sent their trust profile on their user interface.

The evaluator enter a separately sent validation code to view the user's profile. The profile is displayed with a picture of the user, the risk score and a color-coded ring.

Relevant background information is also displayed, such as, for example, that the user's identity has been verified and the user's criminal and civil history. The time period that the information will be available is also displayed.

Unless defined otherwise, all technical terms used herein have the same meaning as commonly understood by one of ordinary skill in the art to which this invention belongs. Any methods and materials similar or equivalent to those described herein also can be used in the practice or testing of the present disclosure.

It must be noted that as used herein and in the appended claims, the singular forms "a", "and", and "the" include plural references unless the context clearly dictates otherwise. The term "step" used herein should generally be defined according to its ordinary meaning and should not be presumed to have a legal meaning under 35 USC 112(f).

While the present disclosure has been described with reference to the specific embodiments thereof, it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present disclosure. All such modifications are intended to be within the scope of the claims appended hereto.

The invention claimed is:

1. A method of creating a trust profile using a computer, the method comprising:
    receiving personal information from a user at the computer;
    gathering biographical information about the user;
    validating the personal information from the gathered biographical information;
    collecting risk information and credential information regarding the user according to the validated personal information from at least one data source;
    assessing the collected risk information, credential information, and validated personal information;
    creating the trust profile for the user from the assessed risk information, credential information and validated personal information;
    creating a trust score based on a standardized scoring system wherein the creating the trust profile includes the trust score; and
    enabling the user to share a trust score or the trust profile with an evaluator.

2. The method of claim 1, further comprising:
    encrypting the trust profile,
    wherein enabling the user to share the trust profile includes enabling the user to share the encrypted trust profile with the evaluator.

3. The method of claim 1, further comprising:
    customizing the trust profile based on the user's preferences;
    wherein enabling the user to share the trust profile with the evaluator includes sharing the customized trust profile with the evaluator.

4. The method of claim 3, wherein customizing the trust profile based on the user's preferences includes enabling the user to limit data that is shared as part of the trust profile.

5. The method of claim 3, wherein customizing trust profile based on the user's preferences includes enabling the user to limit the time period for sharing the trust profile.

6. The method of claim 1, wherein enabling the user to share the trust score includes sending a link with the trust score or trust profile to the evaluator.

7. A system for creating a trust profile for a user, the system comprising:
   at least one hardware processor programmed to:
   receive personal information from a user at the computer;
   gather biographical information about the user;
   validate the personal information from the gathered biographical information;
   collect risk information and credential information regarding the user according to the validated personal information from at least one data source;
   assess the collected risk information, credential information, and validated personal information;
   create the trust profile for the user from the assessed risk information, credential information and validated personal information;
   create a trust score based on a standardized scoring system wherein the creating the trust profile includes the trust score; and
   enable the user to share a trust score or the trust profile with an evaluator.

* * * * *